(12) United States Patent
Swanson et al.

(10) Patent No.: US 8,109,375 B2
(45) Date of Patent: Feb. 7, 2012

(54) CLUTCH SYSTEMS AND METHODS

(75) Inventors: Craig M. Swanson, Perham, MN (US); Darrin Swanson, Perham, MN (US)

(73) Assignee: Kit Masters Inc., Perham, MN (US)

( * ) Notice: Subject to any disclaimer, the term of this patent is extended or adjusted under 35 U.S.C. 154(b) by 454 days.

(21) Appl. No.: 12/437,113

(22) Filed: May 7, 2009

(65) Prior Publication Data
US 2010/0282562 A1 Nov. 11, 2010

(51) Int. Cl.
*F16D 29/00* (2006.01)

(52) U.S. Cl. .............. 192/48.2; 192/48.3; 192/66.22; 192/84.3; 192/85.21; 310/105

(58) Field of Classification Search ........... 192/48.2, 192/48.3, 66.2, 66.22, 85.21, 84.3; 310/105; 416/169 A
See application file for complete search history.

(56) References Cited

U.S. PATENT DOCUMENTS

| | | | |
|---|---|---|---|
| 768,384 A | 8/1904 | Lockwood | |
| 1,371,391 A | 3/1921 | Ollard | |
| 2,172,311 A | 9/1939 | Thomas | |
| 2,259,461 A | 10/1941 | Eason | |
| 2,357,620 A | 9/1944 | Thomas | |
| 2,369,328 A | 2/1945 | Watts | |
| 2,614,396 A | 10/1952 | Ratermann | |
| 2,742,179 A | 4/1956 | Livers | |
| 2,840,316 A * | 6/1958 | Herbenar | 236/35 |
| 3,077,252 A | 2/1963 | Treer | |
| 3,109,555 A | 11/1963 | Samans | |
| 3,185,250 A | 5/1965 | Glazier | |
| 3,202,252 A | 8/1965 | Schilling | |
| 3,253,687 A | 5/1966 | Young | |
| 3,312,319 A | 4/1967 | Carroll et al. | |
| 3,396,909 A | 8/1968 | Knapp | |
| 3,409,305 A | 11/1968 | Nieland | |
| 3,517,683 A | 6/1970 | Chandler | |
| 3,684,397 A | 8/1972 | Elmer | |
| 3,762,517 A | 10/1973 | Hanks | |
| 3,985,214 A * | 10/1976 | Hall et al. | 192/85.53 |
| 4,132,301 A | 1/1979 | Zabonick | |
| 4,199,048 A | 4/1980 | Ishikawa | |
| 4,226,095 A | 10/1980 | Loken | |
| 4,231,457 A | 11/1980 | Cornish | |

(Continued)

FOREIGN PATENT DOCUMENTS

SU 731918 5/1980

OTHER PUBLICATIONS

"Welcome to Kitmasters," [online]. Kit Masters, 2004, [retrieved on Dec. 14, 2000]. Retrieved from the Internet: <URL: www.kit-masters.com>, 7 pages.

(Continued)

*Primary Examiner* — David D Le
*Assistant Examiner* — Huan Le
(74) *Attorney, Agent, or Firm* — Oblon, Spivak, McClelland, Maier & Neustadt, L.L.P.

(57) ABSTRACT

Some embodiments of a clutch system may an output member and an input member can be biased to engage one another along opposing clutch surfaces. When input member drives rotation of the output member and a fan blade device secured thereto, the resulting fan thrust provides supplemental engagement to the opposing clutch surfaces.

20 Claims, 9 Drawing Sheets

U.S. PATENT DOCUMENTS

| | | | |
|---|---|---|---|
| 4,352,365 A | 10/1982 | Boccardo et al. | |
| 4,355,710 A | 10/1982 | Schilling | |
| 4,408,685 A | 10/1983 | Schilling et al. | |
| 4,418,807 A | 12/1983 | Raines | |
| 4,423,803 A | 1/1984 | Malloy | |
| 4,425,993 A | 1/1984 | Schilling | |
| 4,450,947 A | 5/1984 | Hanks | |
| 4,456,110 A | 6/1984 | Hanks et al. | |
| 4,460,079 A | 7/1984 | Hanks | |
| 4,483,430 A | 11/1984 | Carmichael et al. | |
| 4,541,516 A | 9/1985 | Fenzel | |
| 4,570,849 A | 2/1986 | Klaucke et al. | |
| 4,628,953 A | 12/1986 | Correll et al. | |
| 4,657,126 A | 4/1987 | Hanks et al. | |
| 4,750,595 A | 6/1988 | Dayen et al. | |
| 4,766,986 A | 8/1988 | Dayen et al. | |
| 4,770,281 A | 9/1988 | Hanks | |
| 4,826,064 A | 5/1989 | Dayen et al. | |
| 4,830,161 A | 5/1989 | Hall et al. | |
| 4,846,315 A | 7/1989 | Dayen | |
| 4,872,535 A | 10/1989 | Dayen et al. | |
| 4,877,117 A | 10/1989 | Kniebel et al. | |
| 4,909,367 A | 3/1990 | Elmer | |
| 4,934,500 A | 6/1990 | Hanks et al. | |
| 5,059,161 A | 10/1991 | Bredt | |
| 5,215,175 A * | 6/1993 | Fenzel | 192/85.49 |
| 5,242,036 A | 9/1993 | Hennessy et al. | |
| 5,355,983 A | 10/1994 | Radomski et al. | |
| 5,398,794 A | 3/1995 | Walberg et al. | |
| 5,405,254 A | 4/1995 | Hennessy et al. | |
| 5,427,609 A | 6/1995 | Zoglman et al. | |
| 5,586,635 A | 12/1996 | Nelson et al. | |
| 5,611,415 A | 3/1997 | Davis et al. | |
| 5,613,586 A | 3/1997 | Schilling et al. | |
| 5,624,016 A | 4/1997 | Coulter et al. | |
| 5,636,719 A | 6/1997 | Davis et al. | |
| 5,665,882 A | 9/1997 | Chung et al. | |
| 5,667,045 A | 9/1997 | Cummings, III | |
| 5,704,461 A | 1/1998 | Vatsaas et al. | |
| 5,752,810 A | 5/1998 | Hein | |
| 5,765,672 A | 6/1998 | Briggs et al. | |
| 5,877,117 A | 3/1999 | Anderson et al. | |
| 5,878,858 A | 3/1999 | Hein | |
| 5,896,971 A | 4/1999 | Hein | |
| 5,897,107 A | 4/1999 | Zierden et al. | |
| 5,913,396 A | 6/1999 | Hein | |
| 5,984,070 A | 11/1999 | Briggs et al. | |
| 5,994,810 A | 11/1999 | Davis et al. | |
| 6,092,638 A | 7/2000 | Vatsaas | |
| 6,109,871 A | 8/2000 | Nelson et al. | |
| 6,135,029 A | 10/2000 | Oberjohn | |
| 6,253,716 B1 | 7/2001 | Palmer et al. | |
| 6,273,221 B1 | 8/2001 | Schmidt | |
| 6,507,790 B1 | 1/2003 | Radomski | |
| 6,548,929 B2 | 4/2003 | Nelson et al. | |
| 6,600,249 B2 | 7/2003 | Nelson et al. | |
| D478,093 S | 8/2003 | Bentley | |
| 6,811,011 B2 | 11/2004 | Bastien | |
| 6,838,796 B1 * | 1/2005 | Nelson | 310/105 |
| 6,912,353 B2 | 6/2005 | Nelson et al. | |
| 7,104,382 B2 | 9/2006 | Swanson et al. | |
| 2002/0014804 A1 | 2/2002 | Nelson et al. | |
| 2002/0021973 A1 | 2/2002 | Nelson | |
| 2006/0151278 A1 | 7/2006 | Settineri | |
| 2006/0201773 A1 | 9/2006 | Swanson et al. | |

OTHER PUBLICATIONS

"Fan Clutch Overhaul Instructions," Kit Masters, Ramsey, MN, 7 pages, date unknown.
"Kysor On/Off Diagnostic Guide," BorgWarner, http://www.ets.borgwarner.com, 2 pages, Jun. 2002.
"FAIL SAFE™ On/Off K22FA Front Air Fan Drives," Quik-Kool™ Cooling System Components, 20 pages, Jun. 2002.
"FAIL SAFE™ On/Off K22RA Rear Air Fan Clutch Service Guide," Quik-Kool™ Cooling System Components, 2 pages, Jun. 2002.
"FAIL SAFE™ On/Off K22FA Front Air Fan Clutch Service Guide," Quik-Kool™ Cooling System Components, 2 pages, Jun. 2002.
"FAIL SAFE™ On/Off K22RA/K22FA Front Air/Rear Air Lining Replacement," Quik-Kool™ Cooling System Components, 2 pages, Jun. 2002.
"FAIL SAFE™ On/Off K22RA/K26RA Rear Air Fan Clutch Replacement," Quik-Kool™ Cooling System Components, 2 pages, Jun. 2002.
"FAIL SAFE™ On/Off K22FA Front Air Line Installation," Quik-Kool™ Cooling System Components, 2 pages, Jun. 2002.
"FAIL SAFE™ On/Off K22RA/K26RA Fan Hub Series 1077," Quik-Kool™ Cooling System Components, 4 pages, Jun. 2002.
"FAIL SAFE™ On/Off K26RA Rear Air Lining Replacement," Quik-Kool™ Cooling System Components, 2 pages, Jun. 2002.
"FAIL SAFE™ On/Off K26RA Rear Air Fan Clutch Series 1090-09500," Quik-Kool™ Cooling System Components, 8 pages, Jun. 2002.
"FAIL SAFE™ On/Off K22RA Rear Air Clutch Series, 1090-08500" Quik-Kool™ Cooling System Components, 8 pages, Jun. 2002.
"Drive Master® Spring-Engaged Fan Drives," Horton Product Catalogs, http://www.hortoninc.com/products/products.asp, printed from the internet on Oct. 27, 2005, 2 pages.
"Drive Master® Reman Spring-Engaged Fan Drives," Horton Product Catalogs, http://www.hortoninc.com/products/products.asp, printed from the internet on Oct. 27, 2005, 2 pages.
"Drive Master® Two-Speed Fan Drives," Horton Product Catalogs, http://www.hortoninc.com/products/products.asp, printed from the internet on Oct. 27, 2005, 2 pages.
"Drive Master® PolarExtreme Spring-Engaged Fan Drives," Horton Product Catalogs, http://www.hortoninc.com/products/products.asp, printed from the internet on Oct. 27, 2005, 2 pages.
"HT/S Advantage™ Air-Engaged Fan Drives," Horton Product Catalogs, http://www.hortoninc.com/products/products.asp, printed from the internet on Oct. 27, 2005, 2 pages.
"Advantage Reman® Remanufactured Air-Engaged On/Off Fan Drives," Horton Product Catalogs, http://www.hortoninc.com/produts/products.asp, printed from the internet on Oct. 27, 2005, 2 pages.
"PolarExtreme HT/S Reman Fan Drives," Horton Product Catalogs, http://www.hortoninc.com/products/products.asp, printed from the internet on Oct. 27, 2005, 2 pages.
"Klondike® Series Replacement Fan Clutches for K22RA Kits for Kysor's K22RA and K22FA," Horton Product Catalogs, http://www.hortoninc.com/products/products.asp, printed from the internet on Oct. 27, 2005, 3 pages.
"Klondike® Series Replacement Fan Clutch for Kysor's K22RA," Horton, Inc., 2 pages, 2004.
"Bendix® FD-L™ Fan Clutch," Bendix Service Data SD-09-8505, 8 pages, Apr. 2004.
"Bendix® FD-1™ Clutch Type Fan Drive," Bendix Service Data SD-09-8501, 8 pages, Apr. 2004.
"Bendix® FD-2™ Clutch Type Fan Drive," Bendix Service Data SD-09-8503, 8 pages, Apr. 2004.
"Bendix® FD-3™ TorqueMaster Fan Clutch," Bendix Service Data SD-09-8504, 8 pages, Apr. 2004.
Bendix Catalog Index, 20 pages, date unknown.
Horton Catalog, Mar. 1998, 70 pages.
"The Kysor K-22RA Fail Safe™ On-Off Fan Clutch," BorgWarner Cooling Systems, Apr. 2000, 2 pages.
"K-22RA Fan Drive," Kysor Cadillac, 20 pages, Jul. 1996.
"Engine Cooling Fans. Fan Spacers & Adapters," Horton, Inc., pp. 47-48, Jun. 2002.
"Installation and Service Guide—Kysor Front Air Fan Drives," Kysor Cooling Systems N.A., 24 pages, Oct. 1998.
BorgWarner 2004 Product Catalog, front and back covers and pp. 92-256 and 341-389.
Horton Heavy-Duty Vehicle Components Catalog, Jul. 2004, front and back covers and Table of Contents, pp. I-V.
Shigley et al., *Power Transmission Elements—A Mechanical Designer's Workbook*, 1990, New York, McGraw-Hill, pp. 76, 91-95.

\* cited by examiner

CLUTCH SYSTEMS AND METHODS

TECHNICAL FIELD

This document relates to a rotational control apparatus, such as a clutch apparatus to control the rotation of a fan device or other instrument.

BACKGROUND

Vehicle transmission systems, cooling systems, and braking systems may employ clutches or like devices to selectively transmit rotational forces from a drive source to an output member. For example, some cooling systems employ fan clutches that control the output rotation of engine cooling fans. Such a fan clutch can be driven by a drive pulley that rotates in response to the vehicle engine.

In general, the clutch can be operated to engage (or disengage) opposing clutch surfaces, which rotationally interconnect (or rotationally disconnect) the drive pulley and the output member. In an example related to fan clutches, when the clutch surfaces shifted to the engaged position, the output member (carrying fan blades) is driven to rotate along with the drive pulley. When the fan blades are spinning, an axial thrust can be generated that urges the output member axially away from the drive pulley. A bias spring can be used to maintain the engagement between the input and output members (and the opposing clutch surfaces), but the fan thrust can increase the likelihood of slippage between the input and output members. Also, in some circumstances, the fan thrust can overcome the spring bias and cause the opposing clutch surfaces to temporarily disengage.

SUMMARY

Some embodiments of a clutch system may include opposing clutch surfaces that are urged together in response to fan thrust loads applied to the output member. Accordingly, the output member and the input member can be biased to engage one another along opposing clutch surfaces, and when the output member rotates fan blades secured thereto, the resulting fan thrust provides supplemental engagement force rather than urging the opposing clutch surfaces to disengage. In particular embodiments, the supplemental engagement force from the fan thrust can be generated when the input clutch surface is arranged radially outward of the output clutch surface to define a frusto-conical interface that decreases in radius as the clutch surfaces extends away from the drive member. Moreover, in addition to the frictional drive capabilities at the frusto-conical interface, the clutch system may employ an eddy current drive system that causes the output portion to rotate even when the clutch surfaces are disengaged. The multi-speed clutch device can be useful, for example, to generate of cooling air flow both when the vehicle cooling system activates the fan (e.g., by causing the clutch surfaces to engage) and when the vehicle cooling system deactivates the fan (e.g., by causing the clutch surfaces to disengage).

Particular embodiments of a fan clutch system include a drive pulley, a clutch device removably mounted to the drive pulley, and a fan blade device. The clutch device may include an input portion that is coupled with the drive pulley so that the input portion rotates with the drive pulley at a first speed. Also, the clutch device may include an output portion adjustable between a disengaged position and an engaged position so as to frictionally engage the input portion and rotate at the first speed. The clutch device may further include a frusto-conical friction interface at least partially defined by engagement between a first friction surface of the input portion and a second friction surface of the output portion that is arranged radially inward of the first friction surface. The frusto-conical friction interface may decrease in radius as the frusto-conical friction interface extends axially away from the drive pulley. The fan blade device of the system may be rotationally coupled to the output portion of the clutch device so as to generate a fan thrust load when the output portion frictionally engages the input portion to rotate at the first speed. The fan thrust load may urge the output portion in an axial direction away from the drive pulley.

Some embodiments described herein may include a fan clutch device to be mounted to a drive pulley. The fan clutch device may include an input member that is removably mountable to a drive pulley so that the input member rotates with the drive pulley. The fan clutch device may also include an output member. The output member may include one or more mounting members to receive a fan blade device. The output member may also a hub that is selectively movable relative to the input member, and a piston adjustable in an axial direction relative to the input member. The piston may be adjustable between first and second positions. The output member may rotate at a first speed with the input member when the piston is in the first position. The fan clutch device may further include a frusto-conical clutch ring to provide frictional coupling between the input member and the output member. The frusto-conical clutch ring may include generally parallel outer and inner surfaces that each has an increasingly smaller radius as the clutch ring extends axially away from the drive pulley when the fan clutch device is mounted to the drive pulley. The output member may contact the inner surface of the frusto-conical clutch ring, and the input member may contact the outer surface of the frusto-conical clutch ring. The frictional coupling between the input member and the output member may be supplemented by a fan thrust force from the fan blade device when the fan blade device is mounted to the output member. The fan thrust force may urge the output member in an axial direction away from the drive pulley when the output member rotates at the first speed.

Further embodiments may include a method of operating a fan clutch system. The method may include rotating an input portion of a fan clutch device to rotate at a first speed with a drive pulley. The fan clutch device may be removably mounted to the drive pulley. The method may also include adjusting an output portion of the clutch device to frictionally engage the input portion of the clutch device along a frusto-conical friction interface so that the output portion and a fan blade device mounted thereto rotate at the first speed. The output portion that may be arranged radially inward of the frusto-conical friction interface. The frusto-conical friction interface may decrease in radius as the frusto-conical friction interface extends axially away from the drive pulley. The method may further include generating a fan thrust load when the output portion frictionally engages the input portion to rotate at the first speed. The fan thrust load may urge the output portion in an axial direction away from the drive pulley.

These and other embodiments described herein may be configured to provide one or more of the following benefits. First, some embodiments of a fan clutch system generate a supplemental engagement force between opposing frictional surfaces from fan thrust loads applied to the output member. Thus, when the output member rotates fan blades secured thereto, the resulting fan thrust provides the supplemental engagement force rather than urging the opposing clutch surfaces to disengage.

Second, particular embodiments of the fan clutch system can be configured to have a compact design while also providing a relatively large torque rating (a relatively high degree of torque before slippage occurs), which can be supplemented even more when fan blade rotation generates a fan thrust load. For example, the clutch system can have a compact configuration when the input clutch surface is arranged radially outward of the output clutch surface, and at least one of the clutch surfaces is defined by a frusto-conical clutch ring that decreases in radius as the clutch surface extends away from the drive member.

Third, some embodiments of the clutch system can employ an eddy current drive system that urges the output portion of the clutch device to rotate at the second speed (which may be slower than the first speed) when the frictional clutch surfaces are disengaged. Accordingly, the fan clutch system can provide different levels of air flow output from the cooling fan. For example, the fan clutch device can be useful for cooling systems in some vehicles that operate with extended periods of idle, such as buses, vocational equipment (e.g., garbage trucks), or construction equipment vehicles. In such circumstances, the fan clutch device facilitates the flow of cooling air both when the vehicle cooling system activates the fan (e.g., by causing the clutch surfaces to engage) and when the vehicle cooling system deactivates the fan (e.g., by causing the clutch surfaces to disengage).

Fourth, some embodiments of the clutch system can be configured such that the input portion and output portion remain in an assembled state even after the clutch device is removed from the drive pulley. In such circumstances, the input portion and output portion of the clutch device do not necessarily separate when a user attempts to remove the clutch device from the drive pulley. Moreover, components of the eddy current drive system (e.g., the magnet ring and the conductive ring) can be removed from the clutch device while the other components of the clutch device (e.g., the input portion and output portion) remain in the assembled state. Such a configuration permits a user to readily service or replace the components of the eddy current drive system without disassembly of the input portion and output portion of the clutch device.

Some or all of these and other benefits may be provided by the clutch systems described herein.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION OF ILLUSTRATIVE EMBODIMENTS

Figure 1:
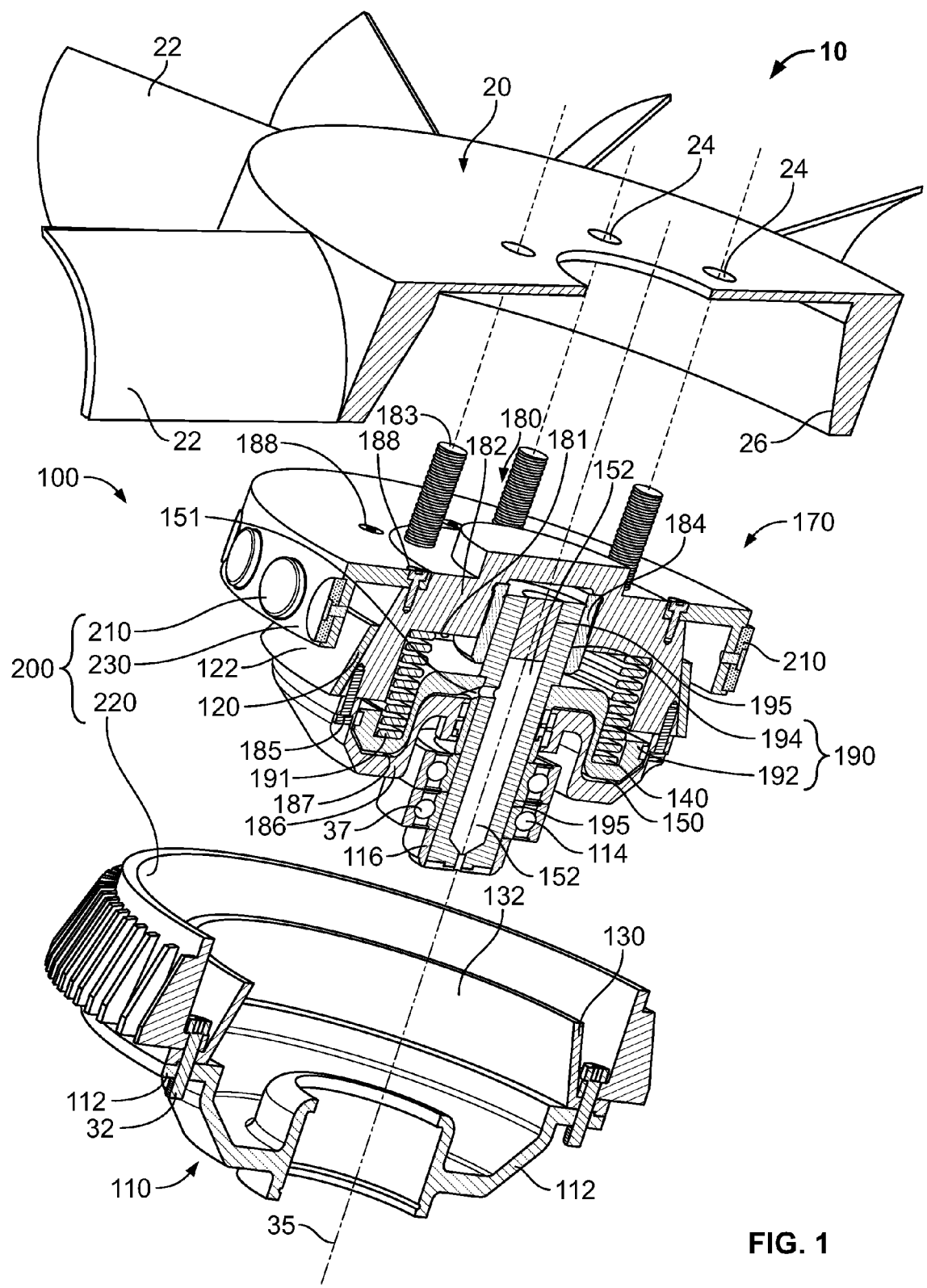
FIG. 1 is a perspective exploded view of a section of a clutch device with a fan blade device, in accordance with some embodiments.
Figure 2:
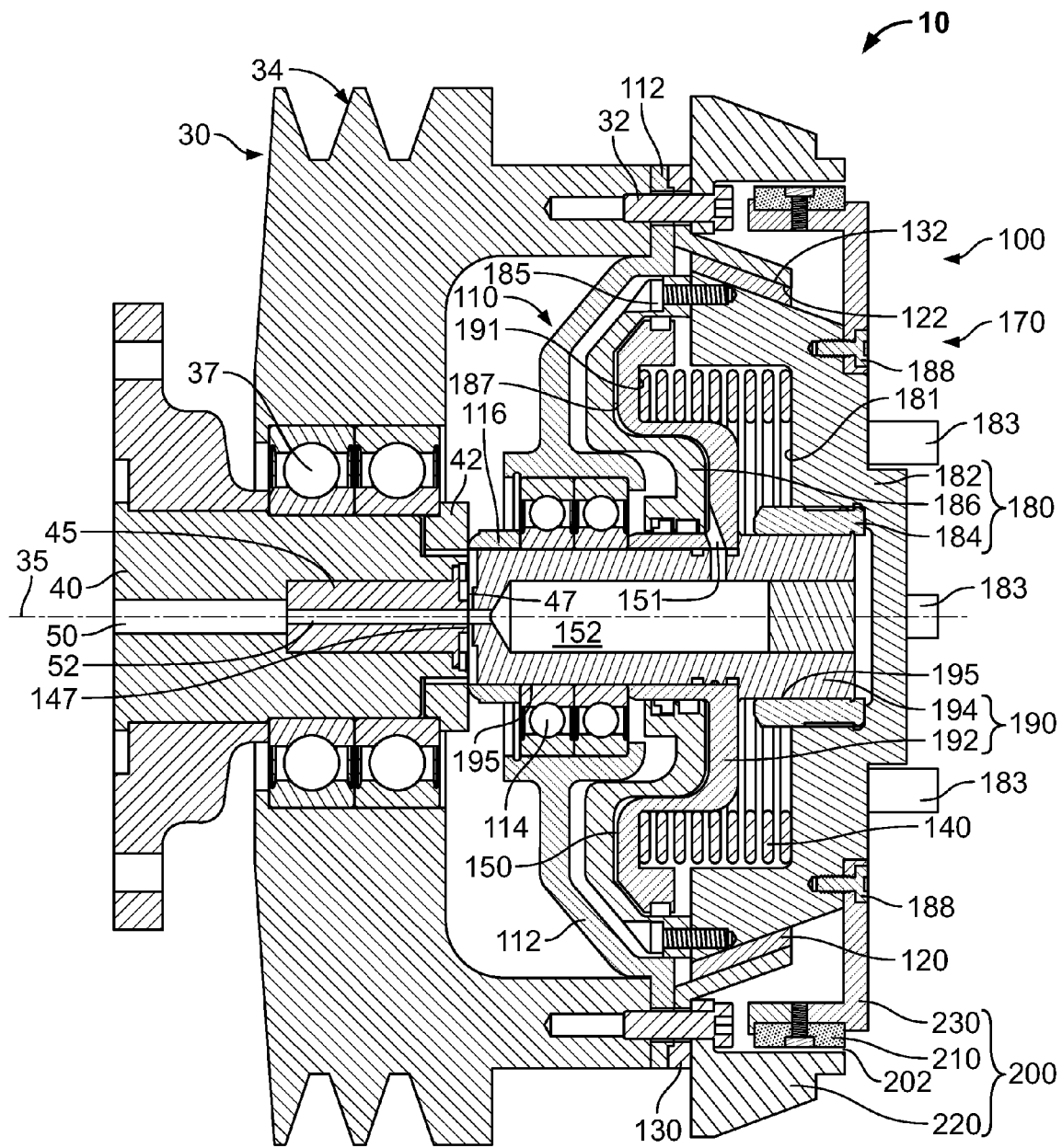
FIG. 2 is a cross-sectional view of a system including the clutch device of FIG. 1 with an output portion shifted to an engaged position in accordance with some embodiments.
Figure 3:
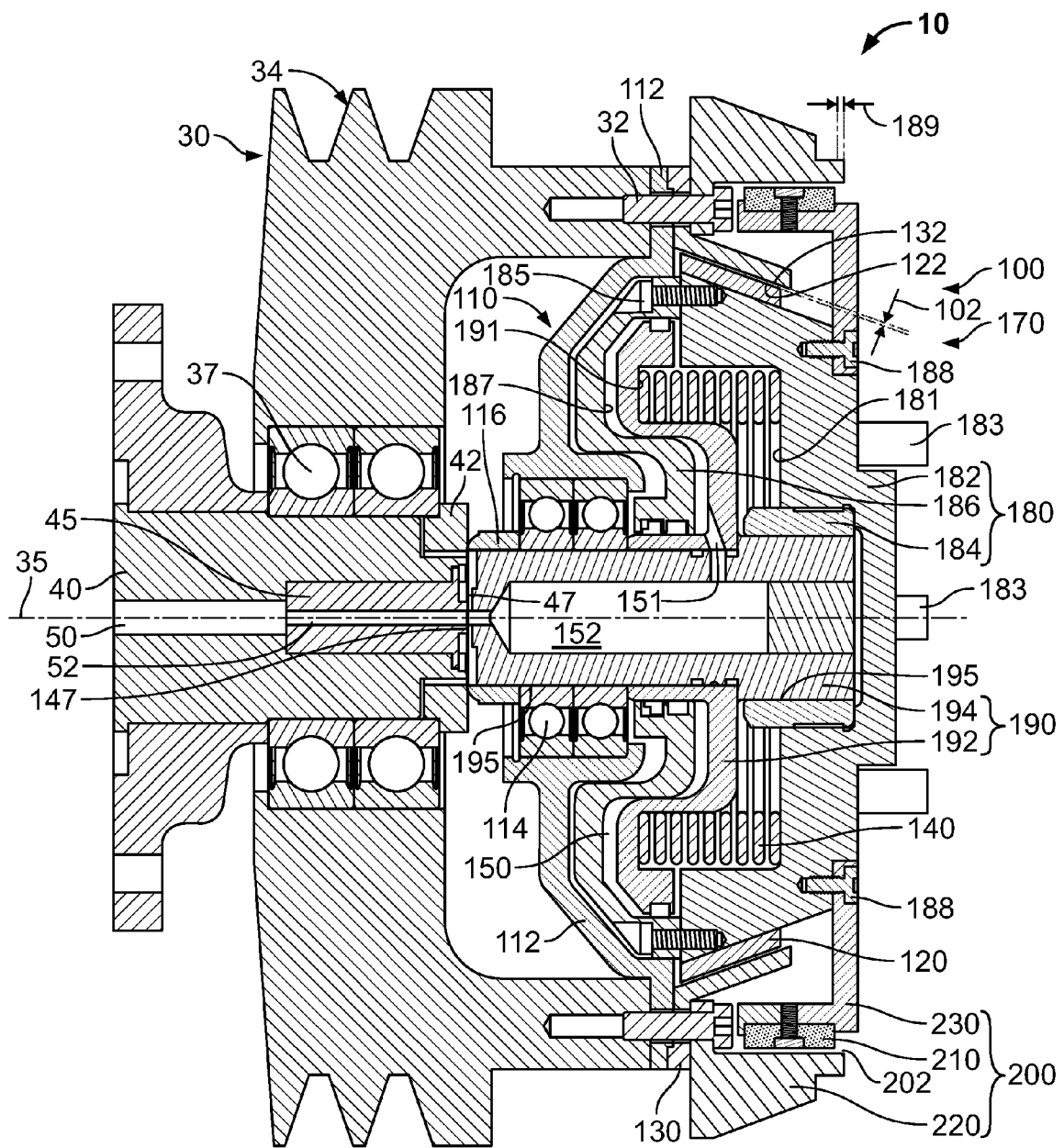
FIG. 3 is a cross-sectional view of the system of FIG. 2 with an output portion shifted to a disengaged position.

Referring to FIGS. 1-3, some embodiments of a clutch system 10 can include a clutch device 100 that provides rotational output for a cooling fan device 20 having a number of fan blades. The clutch device 100 can include opposing clutch surfaces 122 and 132 that are adjustable between a frictionally engaged position and a disengaged position. In this embodiment, the clutch surface 122 can extend along an outer surface of a frusto-conical clutch ring 120 and the clutch surface 132 can extend along an inner surface of a frusto-conical clutch ring 130. The rotational motion of an input portion 110 (as driven by a drive member 30 shown in FIG. 2) can be transmitted via the frictional interface at the clutch ring 120 so that an output portion 170 and the fan blade device 20 mounted thereto are driven at a first speed. As the fan blade device 20 rotates, the thrust load applied to the output portion 170 can urge the clutch surfaces 122 and 132 together in response to fan thrust loads applied to the output portion 170. Accordingly, the fan thrust that is generated from the rotation of the fan blade device provides a supplemental engagement force rather than urging the opposing clutch surfaces 122 and 132 to disengage.

Briefly, in operation, the clutch system 10 may include a drive source such as the drive pulley 30 that is rotated at a first speed due to connection with an engine output shaft via a belt, chain, gear, or the like. (Note that the drive pulley 30 is removed from FIG. 1 for purposes of illustration, but is depicted in FIGS. 2-3.) The clutch system 10 includes the input portion 110 that can be directly or indirectly mounted to the drive pulley 30 so as to rotate at the first speed with the drive pulley 30. In this embodiment, the input portion 110 includes an input plate 112 that is directly mounted to the drive pulley 30 via mounting bolts 32. The clutch system 10 also includes the output portion 170 that can be actuated to engage or disengage with the input portion 110. For example, the output portion 170 can include a piston 180 that is adjustable relative to the input portion 110 so as to shift the clutch ring 120 into engagement (FIG. 2) or disengagement (FIG. 3, refer to a disengagement gap 102) with the opposing ring 130 on the input portion 110. When the piston 180 is adjusted to shift the clutch ring 120 to the engaged position (FIG. 2), the output portion 170 is urged to rotate at the first speed with the input portion 110 and the drive pulley 30. Note that the distance of the shift and the length of the disengagement gap 102 may be exaggerated for purposes of illustration.

Still referring to FIGS. 1-3, in some embodiments, the clutch device 100 can include features (e.g., springs 140, a thrust force created by the rotation of the fan device 20, and the like) that can bias the clutch device 100 to the engaged configuration and features (e.g., a fluid-receiving chamber 150 that can be filled with a pressurized fluid) that can urge the clutch device 100 to the disengaged configuration. For example, when the clutch device 100 is engaged, the springs 140 can urge the output portion 170 to move in an axially outward direction, away from the pulley 30, thereby causing the clutch ring 120 to frictionally engage the opposing ring 130 at the interface of surfaces 122 and 132. Such frictional engagement of the clutch ring 120 causes the fan blade device 20 (connected to the output portion 170) to rotate at the speed of the input portion 10 and the drive pulley 30. The rotation of the fan blade device can generate airflow and a corresponding thrust force that can supplement the engagement of the surfaces 122 and 132. In some embodiments, the clutch device 100 can include springs and/or a thrust force that biases a clutch system to a disengaged configuration, while other features can be activated to engage the clutch system In some embodiments, rotation of the fan blade device 20 can generate a flow of cooling air directed in an axial direction, which provides a resulting fan thrust load in an opposite axial direction. For example, when the clutch device 100 drives the output portion 170 and the fan blade device 20 to rotate, the fan blades can create a cooling airflow directed generally axially toward the drive pulley 30 (FIG. 2) and the vehicle engine radiator or cooling system. In response to generating the airflow in the axial direction toward the engine, a fan thrust load upon the fan blade device 20 is generated in an opposite axial direction away from the pulley 30. Due to the connection of the fan device 20 to the output portion 170, the fan thrust load is imparted to the output portion 170 of the clutch device 100 so as to urge the output portion 170 in the axial direction away from the drive pulley 30 (and the input portion 110 mounted thereto). As previously described, the fan thrust that is generated from the rotation of the fan blade device 20 can serve to supplement the frictional engagement between the clutch surfaces 122 and 132 rather than urging the clutch surfaces 122 and 132 apart. In such circumstances, the rotation of the fan blade device 20 promotes frictional engagement between the clutch ring 120 and the opposing ring 130 and reduces the likelihood of slippage between the two friction surfaces 122 and 132 when the clutch device 100 is in the engaged configuration.

Still referring to FIGS. 1-3, the clutch device 100 can include (in addition to the friction surfaces 122 and 132 to drive the output portion 170 at the first speed) an eddy current drive system 200 that provides rotational output at a second speed when the friction surfaces 122 and 132 of the clutch device 100 are disengaged. In such circumstances, the clutch system 10 can be controlled to provide rotational control, for example, to the cooling fan blade device 20 of an engine cooling system in a vehicle. Accordingly, the cooling fan blade device 20 can be operated at the first speed, thus generating a first thrust force, when the clutch device 100 is engaged and can be operated at the second speed, due to the eddy current drive system 200, when the clutch device 100 is disengaged. When operated at a second speed, the rotation of the fan device 20 can generate a second thrust force that supports engagement of the surfaces 122 and 132. In embodiments where the second speed is less than the first speed, the second thrust force can be less than the first thrust force.

Such a multi-speed clutch system can be disposed to provide different levels of air flow output from the cooling fan 20. For example, some vehicles, such as buses, vocational equipment (e.g., garbage trucks), or construction equipment vehicles, may operate with extended periods of idle during which the cooling system may periodically activate a fan clutch to start rotation of the cooling fan. When the fan clutch is activated, the high-speed rotation of the fan blades in these vehicles might be noticeably loud to both passengers (inside the vehicle cabin) and pedestrians (outside the vehicle cabin), especially when the vehicle is running at idle. However, the multi-speed clutch system 10 described herein can be implemented within the vehicle cooling systems so that the fan blades are rotated at a second speed even when the cooling system has not activated the fan clutch. The second speed of the cooling fan may be less than the first speed, and thus the noise from the cooling fan may be reduced. Furthermore, the multi-speed clutch system 10 can facilitate the flow of cooling air both when the vehicle cooling system activates the fan clutch and when the vehicle cooling system deactivates the fan clutch. Thus, with the fan clutch deactivated, the vehicle's engine temperature can be maintained below a threshold level for a greater period of time, thereby reducing the frequency the fan clutch must be activated by the cooling system to rotate the cooling fan at the first (and perhaps louder) speed.

As shown in FIGS. 1-3, the eddy current drive system 200 can include a set of permanent magnets 210 arranged along an outer circumference of the output portion 170. The eddy current drive system 200 may also include an electrically conductive ring 220 coupled to the input plate 112 of the input portion 110 (e.g., by the bolts 32) so that a radial gap 202 is defined between the permanent magnets 210 and the ring 220. Note that the radial gap 102 may be exaggerated for purposes of illustration. Accordingly, when the clutch ring 120 is disengaged (refer to FIG. 3), the permanent magnets 210 mounted to the output portion 170 can move relative to the ring 220. It is believed that such relative movement causes eddy currents to be produced in the electrically conductive ring 220, which produces a magnetic force between the ring 220 and the magnets 210. Because the ring 220 is rotated at the first speed along with the input plate 112, the force acts upon the permanent magnets 210 to thereby drive the output portion 170 to rotate at the second speed. As there is no direct connection between the magnets 210 and the ring 220 when the clutches are disengaged, the second speed at which the output portion 170 rotates may be less than the first speed.

Referring now to FIGS. 2-3, in some embodiments the drive pulley 30 is rotatably coupled to a support shaft 40 by one or more bearings 37. A nut or collar device 42 is secured to the support shaft 40 and is abutted to the bearing 37 so that the bearings 37 remain substantially fixed in the axial direction relative to the support shaft 40. The drive pulley 30 receives a belt, chain, gear or the like in order to force the drive pulley 30 to rotate in a particular direction about an axis 35. In this embodiment, the support shaft 40 is substantially stationary, and the drive pulley 30 includes a belt engagement surface 34. Rotational power from a vehicle motor or the like may be transmitted through a belt (not shown) to the belt engagement surface 34, thereby urging the drive pulley 30 to rotate about the central axis 35 of the support shaft 40.

A fluid supply input 50 extends into the support shaft 40 for connection to a fluid supply reservoir (not shown). A supply channel 52 extends from the fluid supply input 50 in a substantially axial direction along the central axis 35. In this embodiment, the supply channel 52 extends through a cylindrical outlet 45, which has a mating end 47 to mate with a face seal 147 of the clutch device 100 (see also FIG. 9). As such, when the clutch device 100 is mounted to the drive pulley 30, the face seal 147 is pressed against the mating end 47 to form a mechanical seal. A fluid channel 152 extending axially through the face seal 147 is substantially axially aligned with the central axis 35. Accordingly, the fluid may be transmitted from the fluid supply input 50, through the supply channel 52 and the fluid channel 152, through a port 151, and into the fluid-receiving chamber 150 of the clutch system 10. In some embodiments, the mating end 47, the face seal 147, or both may comprise metals, polymers, or composite materials that can substantially maintain the mechanical seal therebetween while the clutch system 10 is selectively rotated relative to the support shaft 40. The fluid transmitted to the fluid-receiving chamber 150 of the clutch system 10 may be any suitable liquid or gas, as described in more detail below. Such fluids may be received, for example, from a pneumatic air supply system or a hydraulic oil supply system.

Referring again to FIGS. 1-3, in some embodiments, the output portion 170 of the clutch system 10 includes the piston 180 and a hub 190. The piston 180 includes a mounting plate 182, a first spline member 184, and a pressure-actuated member 186, that are assembled together. Likewise, the hub 190 includes a spring-engaging plate 192 and a second spline member 194 that are assembled together. The piston 180 is movable in an axial direction relative to the hub 190 and is substantially stationary in a rotation direction relative to the hub 190. As such, the piston 180 can move axially relative to the hub 190, but rotates at generally the same speed as the hub 190. In this embodiment, the motion of the piston 180 relative to the hub 190 is accomplished by way of a spline connection between the first spline member 184 and the second spline member 194. In other embodiments, the motion of the piston 180 relative to the hub 190 may be accomplished using one or more bushings that permit relative axial movement and anti-rotation dowels that substantially prevent relative rotation between the piston 180 and the hub 190.

In some embodiments, the mounting plate 182 of the piston 180 is configured to receive an output instrument (e.g., a fan blade device 20 depicted in FIG. 1 or another instrument to be rotated). In particular, the mounting plate 182 may include studs 183 that are configured to receive the output instrument. As shown in FIG. 1, the fan blade device 20 can be configured to fit over the output portion 170. The fan blade device 20 can include a plurality of fan blade structures 22 that are arranged to generate air flow (e.g., as part of a vehicle's engine cooling system) and that generate a corresponding fan thrust due to the airflow. The fan blade structures 22 can be angled, tapered, curved, or otherwise configured to direct the output of air flow. In this embodiment, the fan blade device 20 includes mounting holes 24 that are configured to receive the studs 183 extending from the clutch system 10. In alternative embodiments, the output portion 170 of the clutch system 10 may be configured to receive an output instrument other than a fan blade device 20. For example, the mounting plate 182 may be configured to connect with other components that are to be selectively rotated, such as output shafts, gears, brake systems, and the like.

As previously described, in some embodiments the mounting plate 182 can be assembled together with the first spline member 184 and the pressure-actuated member 186 to form the piston 180. The pressure-actuated member 186 of the piston 180 partially defines the fluid-receiving chamber 150 and has a surface 187 that is in contact with the pressurized fluid in the fluid-receiving chamber 150. The pressure-actuated member 186 is fixedly coupled to the mounting plate 182, for example, by bolts 185 fastened into threaded cavities and slidably coupled to the spring engaging plate 192. The first spline member 184 is fixedly coupled to the mounting plate 182, for example, by threads on an external surface of the first spline member 184 that are mated into a threaded cavity of the mounting plate 182. Accordingly, the piston components 182, 184, and 186 can collectively move relative to the hub 190 (e.g., shift axial positions relative to the hub 190 in this embodiment).

Still referring to FIGS. 1-3, the hub 190 includes the second spline member 194 assembled together with the spring-engaging plate 192. The second spline member 194 can be fixedly coupled to the spring-engaging plate 192, for example, by threads on an external surface of the second spline member 194 that are mated into a threaded cavity of the spring-engaging plate 192. The second spline member 194 at least partially defines the fluid channel 152 extending from the face seal 147 to the chamber 150. At least one bearing 114 is disposed between the hub 190 (e.g., the second spline member 194) and the input plate 112. As previously described, the input plate 112 is secured to the drive pulley 30 and rotates along with the drive pulley 30. As such, the bearings 114 permit the hub 190 (including the second spline member 194 and the spring-engaging plate 192) to rotate relative of the input plate 112 and the drive pulley 30. In this embodiment, the bearings 114 are disposed along an outer circumferential surface 195 of the second spline member 194. The bearing 114 may be secured to the second spline member 194 and the input plate 112 using any number of securing means, such as collar devices, locking nuts, locking rings, tongue and groove arrangements, or the like. In this embodiment, the bearings 114 are secured to the hub 190 using a locking nut 116 so that the bearings 114 remain substantially stationary relative to the hub 190 in the axial direction. The bearings 114 are secured to the input plate 112 using a locking ring such that the bearings 114 remain substantially stationary relative to the input plate 112 in the axial direction. Therefore, in this embodiment, the hub 190 may rotate independently of the input plate 112 and drive pulley 30, but the hub 190 remains substantially stationary in the axial direction relative to the input plate 112 and drive pulley 30.

Still referring to FIGS. 1-3, the spring 140 is arranged between the piston 180 and the hub 190 so as to bias the piston 180 toward one of a first position and second position relative to the hub. In this embodiment, the spring 140 is a single, coiled spring that has an inner and outer diameter to fit securely between the mounting plate 182 of the piston 180 and the spring-engaging plate 192 of the hub 190. The spring 140 may be arranged coaxial with the central axis 35 of the clutch device 100. Using only a single spring may simplify assembly and disassembly of the clutch system 10 during manufacture or repair. Because only one spring 140 need be arranged between plates 182 and 192, less time is required to properly align the spring 140 during assembly. Alternatively, other embodiments may use a more complex arrangement having a greater number of smaller springs that are positioned adjacent one another between plates 182 and 192.

Referring now to FIGS. 2-3, when the clutch device 100 is assembled, the spring 140 is compressed between a spring-engaging surface 181 of the piston 180 and the spring engaging surface 191 of the hub 190. Such an arrangement urges the piston 180 in an axial direction away from the drive pulley 30. Thus, in this embodiment, the spring force applied by the spring 140 biases the piston 180 such that the engagement surface 122 of the clutch ring 120 is urged against the opposing friction surface 132 of the ring 130 (see FIG. 2), which is mounted to the input plate 112, the drive pulley 30, and the ring 220 using the bolts 32. In particular, the clutch ring 120 is mounted to the mounting plate 182 so that the engagement surface 122 of the clutch ring 120 is adjacent to the surface 132 of the opposing ring 130. When the engagement surface 122 presses against the opposing surface 132, the output portion 170 frictionally engages the input portion 110, and the output portion 170 thereby rotates at the first speed with the drive pulley 30.

In some embodiments, the frusto-conical clutch ring 120 can be arranged radially outward of the output portion 170 such that the inner surface of the clutch ring 120 can be secured to an outer conical surface of the mounting plate 182. In some embodiments, the clutch ring 120 may include the engagement surface 122, on the outer edge of the frusto-conical clutch ring 120, which at least partially extends in a non-radial direction. In such circumstances, the frusto-conical clutch ring 120 may have an increasingly smaller outer diameter as the engagement surface 122 extends away from the drive pulley 30. Furthermore, in this embodiment, the engagement surface 122 and the inner conical surface of the clutch ring 120 may be generally parallel to one another so that the clutch ring has a generally uniform wall thickness. Thus, the radii of both the engagement surface 122 and the inner conical surface of the clutch ring 120 may become increasingly smaller as the clutch ring 120 extends away from the drive pulley 30. The clutch ring 120 may comprise a metallic, ceramic, or other material that is capable of providing frictional engagement and is capable of dissipating heat generated at the frictional interface. For example, some embodiments of the clutch ring 120 may comprise a material having a static coefficient of friction in the range of approximately 0.2 to approximately 0.6 and, in particular embodiments may comprise a material having a static coefficient of friction in the range of approximately 0.4 to approximately 0.5.

In some embodiments, the clutch ring 120 is secured to the mounting plate 182 and rotates with the output portion 170 and can be arranged radially inward of the opposing ring 130 that rotates with the input portion 110. Thus, the clutch ring 120 may be positioned radially inward of the input portion 110 and radially outward of the output portion 170. The shape and orientation of the frusto-conical clutch ring 120 and the complementary ring 130 may provide the clutch system 10 with a conical wedging action. For example, when the clutch device 100 is in the engaged configuration (see FIG. 2), the clutch ring 120 and opposing ring 130 may abut each other forming a frusto-conical frictional interface between the clutch surfaces (e.g., the engagement surface 122 and the opposing surface 132). This conical wedging action may improve the engagement friction, thereby providing an increase in the torque transfer capabilities. For example, some embodiments of the clutch system 10 may provide torque ratings of approximately 2700 in-lbs, 2800 in-lbs, 2900 in-lbs, 3000 in-lbs, or more, and particular embodiments may provide torque ratings in the range of approximately 3000 in-lbs to approximately 5000 in-lbs. The substantial torque transfer capabilities may be caused by a number of factors, such as the coefficient of friction of the clutch ring 120, the conical angle of the clutch ring 120, the spring force applied by the spring 140, the axial thrust force produced by rotation of the fan device 20, and other factors that affect the torque rating of the clutch system 10.

Referring more closely to FIG. 3, the output portion 170 of the clutch system 10 may disengage the input portion 110 when fluid is introduced into the chamber 150 under sufficient pressure to axially shift the piston 180 relative to the hub 190. When the engagement surface 122 is shifted away from the opposing surface 132, the output portion 170 (including the piston 180 and hub 190 in this embodiment) is no longer driven to rotate at the first speed due to the direct friction engagement with the input portion 110. Instead, as described in more detail below in connection with FIGS. 4-8, the eddy current drive system 200 of the clutch device causes the output portion 170 to rotate at a second speed that is different from the first speed. As previously described, fluid may enter the chamber 150 through the fluid channel 152. In this embodiment, the fluid-receiving chamber 150 is at least partially defined by the space between the pressure-actuated member 186 of the piston 180 and the spring-engaging plate 192 of the hub 190. When a sufficient amount of fluid pressure has built up in the chamber 150, the piston 180 is forced in an axial direction toward the drive pulley 30, thus overcoming the bias of the spring 140 and the axial thrust force created by the rotation of the fan device 20 that collectively encourage the piston 180 away from the drive pulley 30.

As shown in FIG. 3, when the clutch ring 120 of the output portion 170 is shifted away from the opposing ring 130 on the input portion 110, the gap 102 is created between the engagement surface 122 of the clutch ring 120 and the friction surface 132 of the opposing ring 130. It should be understood that a displacement 189 of the hub 180 and the length of the gap 102 depicted in FIG. 3 (and in FIGS. 6 and 8) may be exaggerated in the drawings for purposes of illustration. The gap 102 can be sufficient to eliminate contact between the clutch ring 120 and the opposing ring 130. In such circumstances, the output portion 170 (including the piston 180 and hub 190 in this embodiment) is no longer driven to rotate by direct engagement with the input portion 110. When the piston 180 is shifted to the disengaged position depicted in FIG. 3, the output portion 170 (including the piston 180 and hub 190 in this embodiment) can rotate relative to the input portion 110 and drive pulley 30 due to the bearing connection 114. Accordingly, the output portion 170 may rotate at the second speed even though the drive pulley 30 continues to rotate at the first speed.

As previously described, the gap 102 between the engagement surface 122 and the opposing friction surface 132 is created when a fluid under sufficient pressure is received in the chamber 150. If force from the fluid pressure in the chamber 150 is sufficient to overcome the collective force of the bias of the spring 140 and thrust force generated by the rotation of the fan device 20, the piston 180 is shifted in the axial direction toward the drive pulley 30. In some embodiments, the fluid pressure in the chamber 150 that is required to overcome the spring force may be approximately predetermined from the spring constant, the desired gap 102, the dimensions of the chamber 150, the fan thrust force, and other such factors. As previously described, the fluid supply input 50 receives the fluid from the reservoir (not shown). The fluid passes through the fluid supply channel 52, through the face seal 147, through the fluid channel 152, and into the chamber 150.

Still referring to FIG. 3, the fluid in the chamber 150 may have a single possible leak path at the outer periphery between the pressure-actuated member 186 and the spring engaging plate 192. This leak path can be sealed using a ring seals 154 (see FIG. 6) that is disposed along the outer periphery of the leak path between the pressure-actuated member 184 and the spring engaging plate 192 at interfaces 153. The seal 154 is positioned as such to prevent fluid leakage through the leak path. An inner seal 153 can be arranged at the inner periphery between the pressure-actuated member 186 and the spring engaging plate 192. Thus, a fluid leak may be quickly detected and repaired by checking the seals 153 and 154 and by checking the mechanical seal at the face seal 147. By reducing the number of seals in the clutch device design, the time and cost associated with detecting which seal is faulty may be significantly reduced. As previously described, the piston 180 remains rotationally stationary relative to the hub 190 in this embodiment, so the seals 153 and 154 do not endure a relative rotational motion. When the seals 153 and 154 are internal to the clutch device 100 and are limited to such minimal sliding motion, the possibility of contaminants entering the chamber 150 through the seals 154 may be significantly reduced. Such a reduction is contamination may increase the longevity the clutch device 100 and may reduce the need for repair or replacement.

Referring again to FIGS. 1-3, the piston 180 in this embodiment serves as both the component that shifts to engage the input portion 110 (via the clutch ring 120) and the component that receives an output instrument (such as the fan blade device 20 depicted in FIG. 3). The output instrument mounted to the studs 183 of the piston 180 may also be shifted in the axial direction as the piston 180 is actuated, but the displacement in the axial direction may be relatively small such that this shifting motion has little or no impact on the output instrument. Similarly, the displacement in the axial direction may be relatively small such that the shifting motion of the piston 180 relative to the hub 190 has little or no impact on the longevity and performance of the seals 154.

Figure 4:
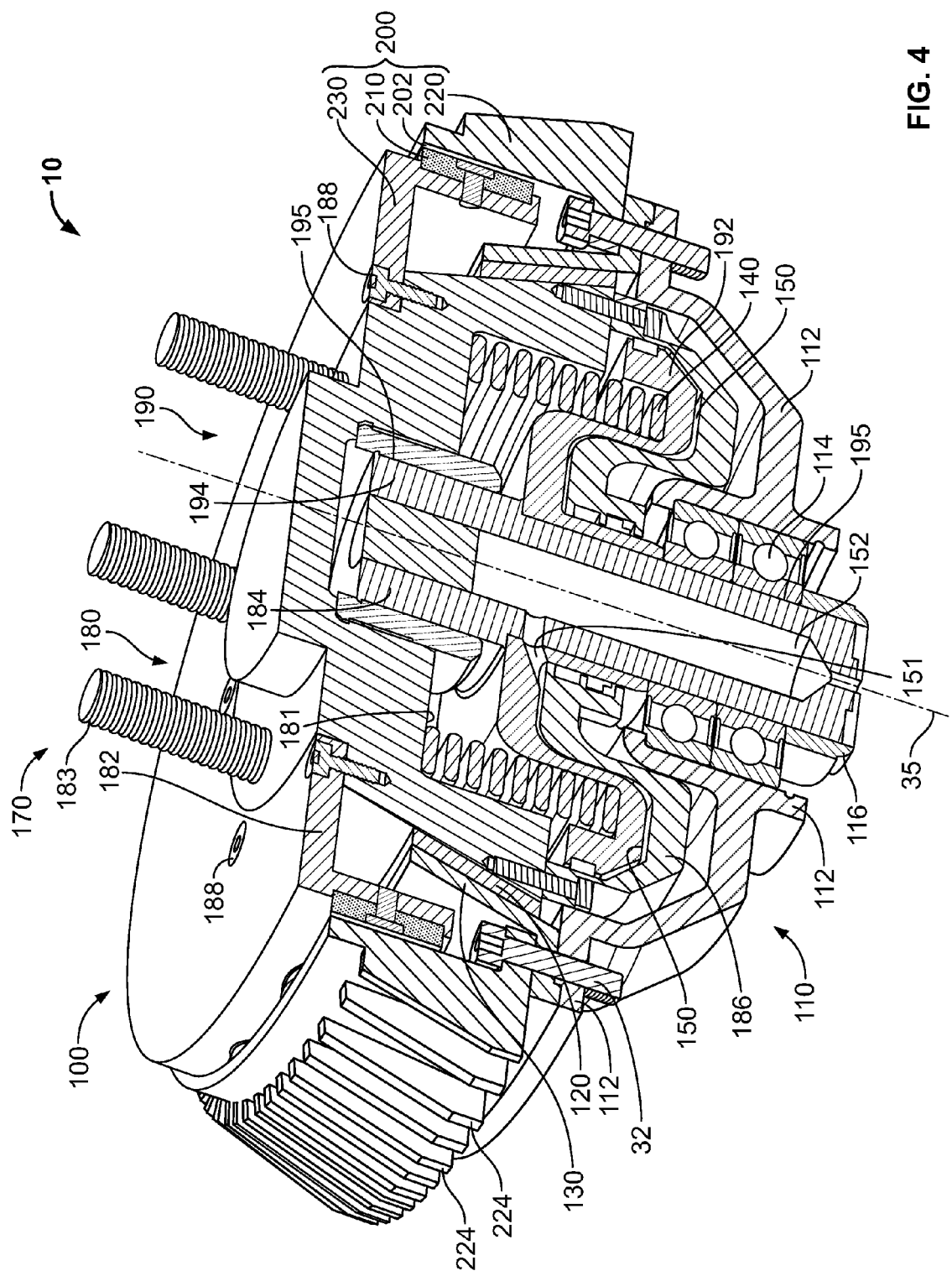
FIG. 4 is a perspective view of the clutch device of FIG. 1 in accordance with some embodiments.
Figure 5:
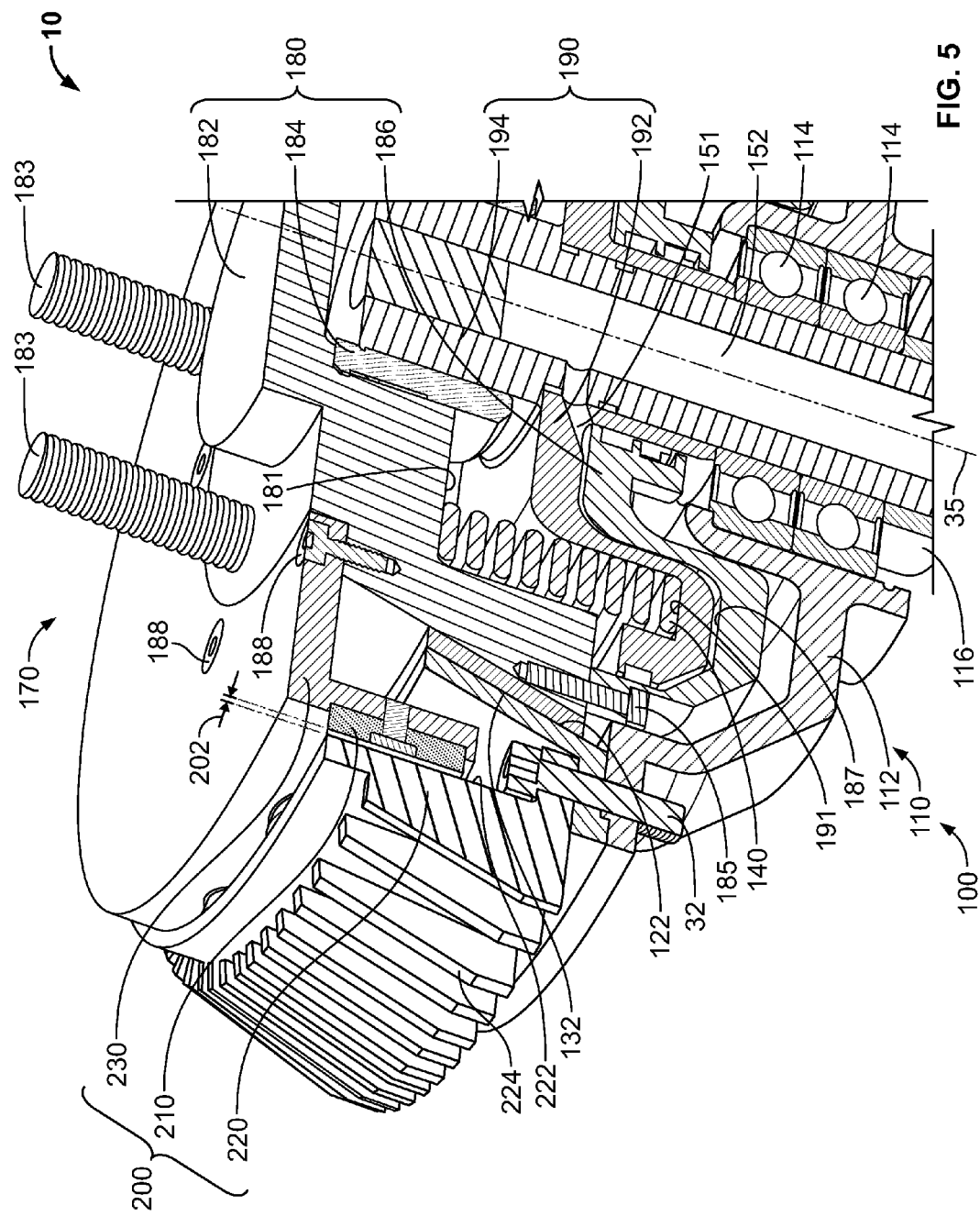
FIG. 5 is a perspective view of a portion of the clutch device of FIG. 4.
Figure 6:
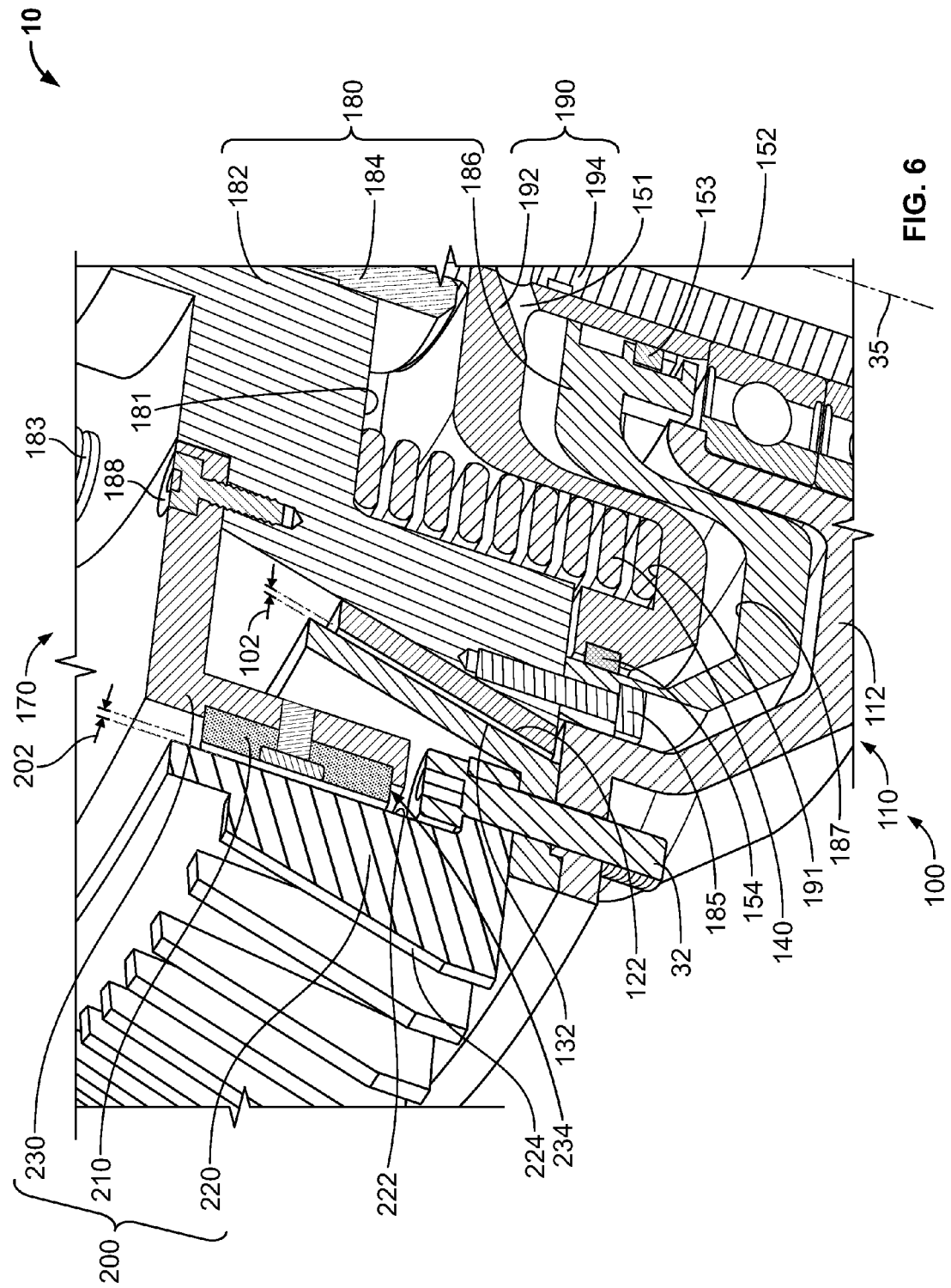
FIG. 6 is a perspective view of a portion of the clutch device of FIG. 5.

Referring now to FIGS. 4-6, the eddy current drive system 200 can operate as a secondary drive component that urges the output portion 170 to rotate at a second speed when the output portion 170 is disengaged from the input portion 110. As previously described, the eddy current drive system 200 includes the permanent magnets 210 that are arranged adjacent to the electrically conductive ring 220. In some embodiments, the magnets 210 can be arranged within a magnet ring 230 (e.g., the magnet ring 230 mounted to the output portion 170 using bolts 188) in a manner that provides consistent operation and efficient dissipation of heat from the eddy current drive components. Moreover, some embodiments of the ring 220 can be formed from a generally nonmagnetic, electrically conductive material such as aluminum or the like. Thus, the ring 220 is not necessarily attracted or repelled by the magnets 210 during assembly, which reduces the complexity of manufacturing and repairing the clutch device. Furthermore, in those embodiments in which the conductive ring 220 is formed from aluminum, the ring 220 may have a lower mass (e.g., compared to some magnetic materials), more efficient heat dissipation properties, and reduced manufacturing complexities.

The permanent magnets 210 can be carried in pockets 234 (see FIG. 6) of a magnet ring 230 so that the magnets 210 are at least partially located within the magnet ring 230, are oriented to face radially outward along a circumferential surface, and can partially extend radially outward from the circumferential surface of the magnet ring 230. In such circumstances, the electrically conductive ring 220 may be arranged radially outward of the magnets 210 so that an inner circumferential surface 222 (FIGS. 5-6) of the electrically conductive ring 220 is adjacent to the magnets 210. Accordingly, a radial gap 202 (FIGS. 5-6) is defined between the magnets 210 and the inner circumferential surface 222 of the conductive ring 220. The gap 202 can be configured to be large enough so as to avoid frictional contact between the magnets 210 and the ring 220. Also, the radial gap 202 can be configured to be small enough so that relative movement between the magnets 210 and the ring 220 induces the formation of eddy currents in the conductive material of the ring 220. For example, in this embodiment, the radial gap 202 between the magnets 210 and the ring 220 is about 0.25 inches or less, about 0.005 inches to about 0.100 inches, and preferably about 0.020 inches. Note that the radial gap may be exaggerated in the figures for the purpose of illustration. It is believed that the eddy currents are formed in the conductive ring 220 in response to relative motion of the magnets 210 because a moving magnetic field intersects a conductor (e.g., the conductive ring 220). The relative motion may cause a circulating flow of electrons, or current, within the conductive material of the ring 220. These circulating eddies of current temporarily create electromagnets with magnetic fields that oppose the effect of the applied magnetic field (from the magnets 210). Accordingly, the eddy current drive system 200 can create a force that urges the magnet ring 230, and thus the output portion 170, to rotate at a second speed that is different from the first rotational speed of the input portion and the drive pulley 30 (drive pulley 30 is shown in FIGS. 2-3).

Still referring to FIGS. 4-6, in some embodiments, the conductive ring 220 can be coupled to the input potion 110 while the permanent magnets 210 are coupled to the output portion 170. For example, the conductive ring 220 may include a flange that is engaged by some or all of the mounting bolts 32 (FIGS. 2-3) that join the input plate 112 and the friction ring 130 with the drive pulley 30. In such circumstances, the conductive ring 220 can be urged to rotate at the first speed along with the input portion 110 and the drive pulley 30. The permanent magnets 210 are mounted into the pockets 234 of the magnet ring 230, which includes a flange that is retained to the piston 180 by the bolts 188. Accordingly, when the eddy current drive system 200 urges the permanent magnets 210 to move in response to the eddy currents generated in the ring 220, the components of the output portion 170 are also urged to move in a similar manner.

The configuration in which the conductive ring 220 is coupled with the input portion 110 (to rotate with the drive pulley 30) can provide improved heat dissipation characteristics for the eddy current drive system 200. In particular, the eddy current drive system 200 can generate heat within the conductive ring 220 due to the production of the eddy currents within the conductive material. The heat in the conductive ring 220 can be dissipated by air flow passing over the conductive ring 220. Because the ring 220 is arranged on the input portion 110 of the clutch device 10, the ring 220 rotates at the first speed with the drive pulley 30—both when the clutch ring 120 is engaged and disengaged. As such, in this embodiment, the conductive ring 220 is provided with a greater opportunity to dissipate heat to the surrounding air because it is arranged on the input portion 110 and radially outward from the magnet ring 230. In addition, since the magnets 210 extend at least partially from the magnet ring 230, additional surface area of the magnets 210 is accessible by surrounding air, which provides a greater opportunity for the magnets 210 to dissipate heat to the surrounding air.

In addition, some embodiments of the conductive ring 220 can be equipped with a plurality of cooling fins 224 extending radially outward (e.g., opposite from the inner circumferential surface 222 adjacent to the permanent magnets 210). The cooling fins 224 can provide even greater heat dissipation characteristics for the eddy current drive system 200. For example, the heat generated by the production of eddy currents in the conductive ring 220 can be dissipated radially outward through the cooling fins 224 and to the surrounding air. Also, the conductive ring 220 is coupled to the input portion 110 and thereby rotates at the first speed with the drive pulley 30 during operation. Therefore, the cooling fins 224 rotate with the ring 220 and generate increased air movement that enhances the heat dissipation from the ring 220.

Still referring to FIGS. 4-6, the cooling fins 224 of the conductive ring 220 can be configured to have a tapered shape. In particular, the cooling fins 224 can be smaller in size at the end near the mounting plate 182 (e.g., the part that receives the fan blade device 20 or other instrument) and larger in size at the end near the input plate 112. The tapered configuration of the cooling fins 224 can facilitate assembly of the fan blade device 20 or other instrument onto the studs 183 of the mounting plate 182. For example, as shown in FIG. 1, the fan blade device 20 can include an inner tapered surface 26 that can fit over the cooling fins 224 of the conductive ring 220 as the fan blade device 20 is mounted to the output portion 170. The cooling fins 224 and the tapered surface 26 of the fan blade device 20 can be sufficiently spaced after assembly so that air is permitted to pass over the cooling fins 224 during operation. It should be understood that, in other embodiments, the cooling fins 224 of the conductive ring 220 can have other configurations such as straight and non-tapered fins, curved fins, or the like.

As previously described, some embodiments of the conductive ring may be formed from a generally nonmagnetic material, such as aluminum. In these embodiments, the generally nonmagnetic material of the ring 220 is electrically conductive so as to produce the eddy currents when exposed to relative motion with the permanent magnets 210. The aluminum or other nonmagnetic material of the ring 220 can facilitate assembly or disassembly of the clutch device 100 (e.g., during repair). For example, the magnets 210 are not necessarily attracted to (or repelled from) the ring 220 during assembly, which reduces the complexity of manufacturing and repairing the clutch device 10. During assembly, the ring 230 with the permanent magnets 210 may be inserted to a position that aligns with the mounting holes for the bolts 188. In such circumstances, the permanent magnets 210 are positioned adjacent to the conductive ring 220. If the conductive ring 220 was formed from steel or another magnetic flux conductive material, the alignment of the magnetic ring 230 may be more complex due to the magnetic forces that could urge the magnetic ring 230 to a non-aligned position. However, in this embodiment, the conductive ring 220 is formed from a generally nonmagnetic material such as aluminum, and thus the ring 230 can be readily aligned with the mounting holes during assembly without magnetic force interference from the conductive ring 220.

Moreover, in those embodiments in which the conductive ring 220 is formed from aluminum or another generally nonmagnetic material, the ring 220 can have a relatively low mass (e.g., compared to steel or other magnetic materials), efficient heat dissipation properties, and reduced manufacturing complexities. For example, the conductive ring 220 formed from aluminum can have greater thermal conductivity than steel or other magnetic materials. As such, the aluminum material in the ring 220 can enhance the heat dissipation characteristics of the eddy current drive system 200. Also, the conductive ring 220 formed from aluminum can have a lower mass (and rotational inertia) than other magnetic materials that have a greater material density. Finally, the conductive ring 220 formed from aluminum can be manufactured in a cost-efficient manner that does not necessarily require complex lamination techniques or embedded magnetic materials.

Referring to FIG. 6, the eddy current drive system 200 is configured so that the gap 202 is defined between the permanent magnets 210 and the conductive ring 220. As previously described, the gap 202 may be radially outward of the permanent magnets 210 and may be small enough so that eddy currents are produced in the conductive ring 220 during relative motion between the ring 220 and the magnets 210. In such embodiments, the clutch system 10 can be configured to maintain the radial gap 202 at a generally constant dimension even when the piston 180 is axially shifted relative to the input plate 112. For example, the permanent magnets 210 are carried in the magnet ring 230, which is assembled to the piston 180. As previously described, the piston 180 can be axially shifted relative to the input plate 112 when sufficient fluid pressure is introduced into the chamber 150. Such axial movement of the piston 180 causes the clutch ring 120 to disengage the opposing frictional surface 132 (refer to gap 102 shown in FIG. 6). In this embodiment, however, the radial gap 202 between the magnets 210 and the conductive ring 220) is not changed by the axial motion of the piston 180 (and the axial motion of the ring 230 assembled to the piston 180). Accordingly, the magnet ring 230 and the permanent magnets 210 may shift axially along with the piston 180 (refer to the displacement 189 shown in FIG. 3), but the gap 202 between magnets 210 and the conductive ring 220 can remain substantially constant. In such circumstances, the eddy current drive system 200 can provide consistent operation during use even if the piston 180 causes the relative axial displacement 189 (see FIG. 3) between the ring 220 and the magnets 210. (Note that the disengagement gap 102, the displacement distance 189 (FIG. 3), and the radial gap 202 may be exaggerated in the drawings for purposes of illustration.)

Figure 7:
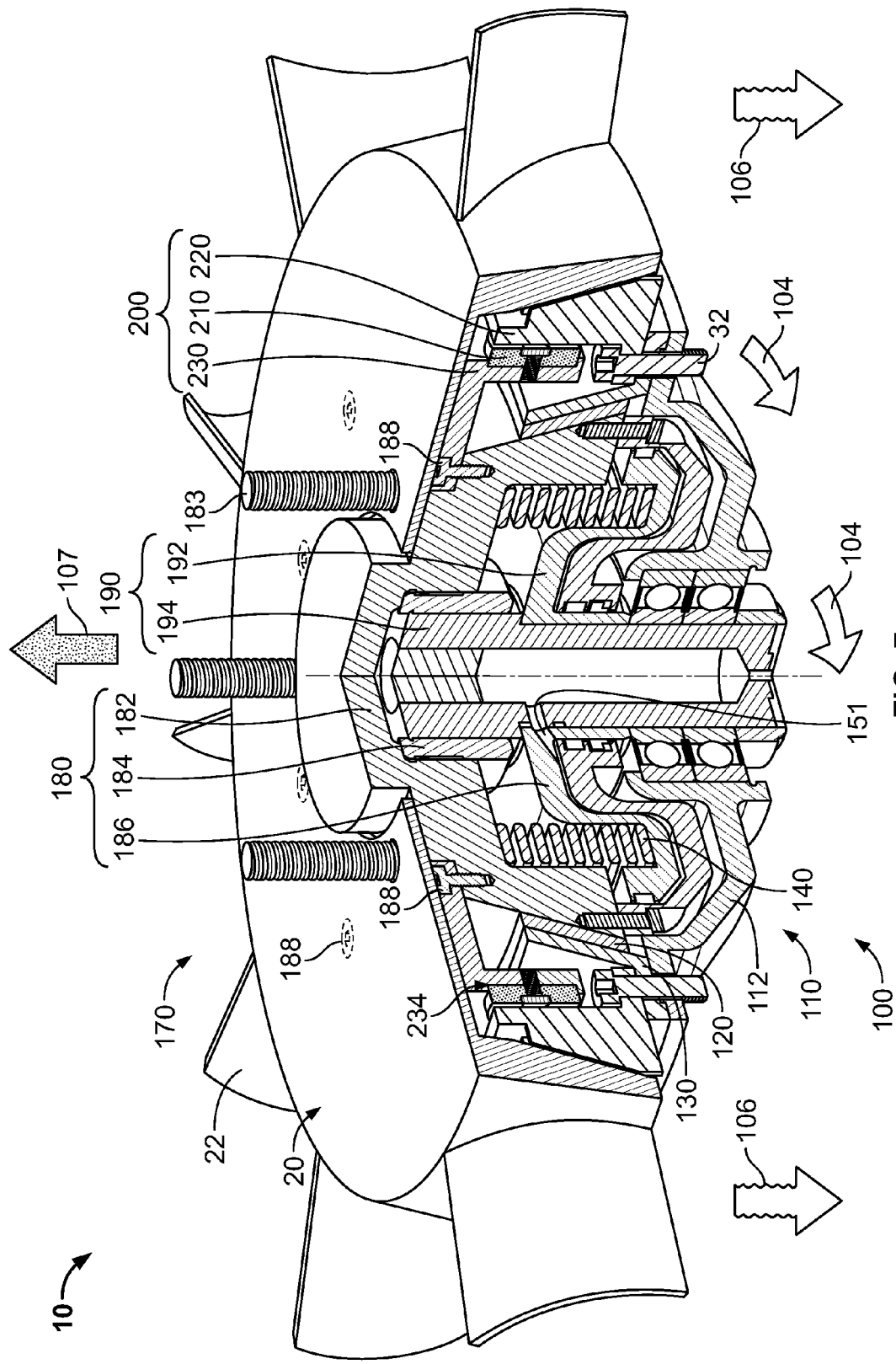
FIG. 7 is a perspective section view of a clutch device with a fan blade device driven to rotate at a first speed, in accordance with some embodiments.
Figure 8:
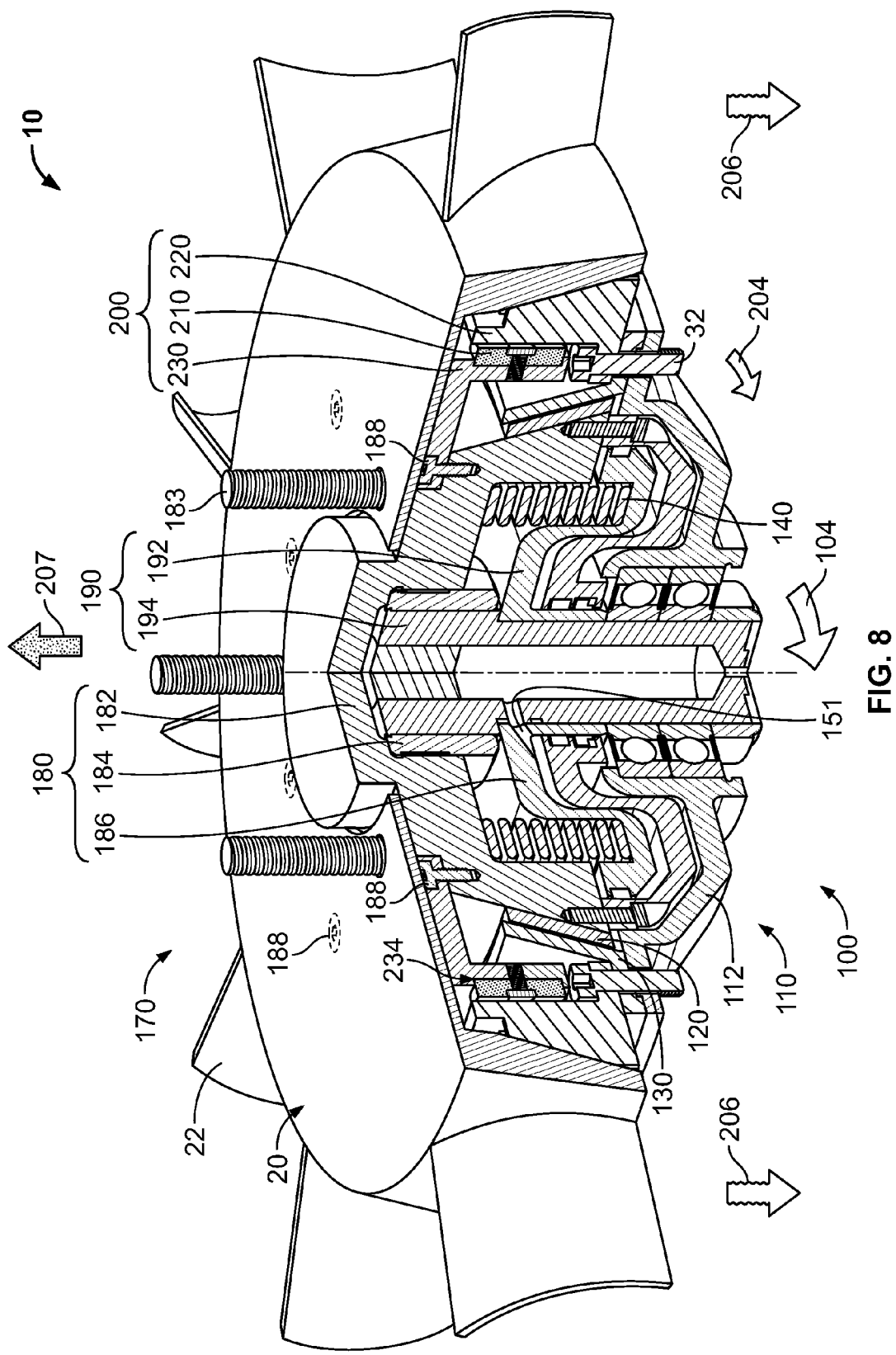
FIG. 8 is a perspective section view of the clutch device of FIG. 7 with the fan blade device driven to rotate at a second speed.

Referring now to FIGS. 7-8, in operation the clutch system 10 can be configured such that a fan thrust force 107 generated from the rotation of the fan blade device 20 provides a supplemental engagement force rather than urging the opposing clutch surfaces 122 and 132 (see FIG. 1) to disengage. As previously described, the clutch device 100 can be directly or indirectly mounted to the drive pulley 30 that is rotated at a first speed 104 due to connection with an engine output shaft via a belt, chain, gear, or the like. (The drive pulley 30 is removed from FIGS. 7-8 for purposes of illustration, but is depicted in FIGS. 2-3). In this embodiment, the input portion 110 of the clutch device 100 includes the input plate 112 that is directly mounted to the drive pulley 30 via the bolts 32. Accordingly, the input portion 110 of the clutch device 100 is urged to rotate at the first speed 104 both when the output portion 170 is engaged (FIG. 7) and disengaged (FIG. 8).

As shown in FIG. 7, the output portion 170 of the clutch device 100 can frictionally engage with the input portion 110 (along the clutch ring 120), which results in the output portion 170 being rotated at the first speed 104 along with the input portion 110 and the drive pulley 30. As previously described, the output portion 170 includes the piston 180 that is adjustable relative to the input plate 112 so as to shift the clutch ring 120 into engagement with the opposing ring 130 on the input plate 112. Accordingly, the frictional engagement between the clutch ring 120 and the opposing ring 130 creates a secure force transmission between the input portion 110 (rotating at the first speed 104) and the output portion 170 (thereby driven to rotate at the first speed 104). When the fan blade device 20 is assembled to the studs 183 of the output portion 170, the fan blade structures 22 are also driven at the first speed 104 (refer to FIG. 7).

In some embodiments, when the fan blade device is rotated at the first speed 104, the fan blade device 20 can generate a cooling airflow 106 directed generally axially over the clutch system 10, over the drive pulley 30, toward vehicle engine, and the like. When generating the airflow 106 in the axial direction toward the engine, a fan thrust force 107 is generated in an opposite axial direction away from the pulley 30. Due to the connection of the fan device 20 to the mounting plate 182 of the piston portion 180, the thrust force 107 is transferred as an axially force applied to the mounting plate 182, and thus to the piston 180 of the output portion. In some embodiments, this fan thrust force 107 can supplement the axial spring force imparted by the bias spring 140 on the piston 180, thus further urging the piston 180 to press in the axially direction away from the drive pulley 30. In this way, the rotation of the fan blade device 20 at the first speed 104 urges engagement between the output portion 170 and the input portion 170 because the fan thrust force 107 causes supplemental compression of the clutch ring 120 against the opposing ring 130. Accordingly, the clutch configuration depicted herein can employ the fan thrust force 107 to provide a supplemental engagement force along the clutch ring 120, thereby reducing the likelihood of slippage between the two friction surfaces 122 and 132 when the output portion 170 frictionally engages the input portion 110.

As shown in FIG. 8, when the piston 180 is adjusted to shift the clutch ring 120 to the disengaged position, the output portion 170 is urged by the eddy current drive system 200 to rotate at the second speed 204 that (in this embodiment) is less than the first speed but greater than zero. As previously described in connection with FIG. 3, the output portion 170 of the clutch device 100 can disengage the input portion 110 when fluid is introduced into the chamber 150 under sufficient pressure to axially shift the piston 180. In particular, pressurized fluid may enter the chamber 150 through the fluid channel 152. In this embodiment, the fluid-receiving chamber 150 is at least partially defined by the space between the pressure-actuated member 186 of the piston 180 and the spring engaging plate 192 of the hub 190. When a predetermined amount of fluid pressure has built up in the chamber 150, the piston 180 is forced in an axial forward toward the drive pulley 30, thus overcoming the spring force and the thrust force (e.g., the thrust force 107, shown in FIG. 7, that is generated by the rotation of the fan blade device 20) that urge the piston 180 away from the drive pulley 30. When the engagement surface 122 of the clutch ring 120 is shifted away from the opposing ring 130 on the input portion 110, the disengagement gap 102 is created between the engagement surface 122 of and the opposing ring 130. The gap 102 can be sufficient to eliminate contact between the clutch ring 120 and the opposing ring 130. In such circumstances, the output portion 170 (including the piston 180 and hub 190 in this embodiment) is no longer driven to rotate at the first speed 104 by direct frictional engagement with the input portion 110. Instead, the output portion 170 is driven to rotate at a second, lesser speed 204 due to the eddy current drive system 200.

Still referring to FIG. 8, the eddy current drive system 200 includes the previously described magnets 210 arranged adjacent to the electrically conductive ring 220. In this embodiment, the permanent magnets 210 are mounted on a pockets 234 and are oriented radially outward so that the inner circumferential surface 222 (FIGS. 5-6) of the ring 220 is adjacent to the magnets 210. The radial gap 202 (FIGS. 5-6) defined between the magnets 210 and the conductive ring 220 is configure to be large enough so as to avoid frictional contact between the magnets 210 and the ring 220 and is configured to be small enough so that relative movement between the magnets 210 and the ring 220 induces the formation of eddy currents in the conductive material of the ring 220. As previously described, it is believed that the eddy currents are formed in the conductive ring 220 in response to relative motion of the magnets 210 because a moving magnetic field intersects the conductive ring 220. The circulating eddies of current can temporarily create electromagnets with magnetic fields that oppose the effect of the applied magnetic field (from the permanent magnets 210). Accordingly, the eddy current drive system 200 can create a force that urges the output portion 170 to rotate at the second speed 204 when the input portion 110 is rotated with drive pulley 30 at the first, larger speed 104.

In some embodiments, when the clutch device 100 is in the disengaged configuration, the fan device 20 can rotate, due to the eddy current drive system 200, at the second speed 204 that is less than the first speed 104 of the pulley 30 and input portion 110. When rotating at the second speed 204, an airflow 206, similar to the airflow 106 shown in FIG. 7, is generated by the fan device 20. However, when the second speed 204 is less than the first speed 104, the airflow 206 generated is less than the airflow 106. As such, a thrust force 207 is generated that is less than the thrust force 107 (see FIG. 7). In these embodiments, the combined bias of the spring force and the thrust force 207 generated at the second speed 204 can be less than the spring force and the thrust force 107 generated at the first speed 104. When the fluid pressure within the fluid chamber 150 is sufficient to disengage the clutch device 100 when the fan device 20 is rotating at the first speed 104, the pressure will remain sufficient to maintain the clutch device 100 in the disengaged configuration when the fan device 20 rotates at the second speed 204 that is slower than the first speed 104.

Such embodiments of the clutch system 10 can be useful, for example, to control the rotation of a cooling fan in a vehicle cooling system. For example, as shown in FIGS. 7-8, the fan blade device 20 can be assembled to the output potion 170 of the clutch device 100 so that the fan blade structures 22 rotate along with the output portion 170. In such circumstances, the fan blades can be driven to rotate at the first speed 104 due to rotational interconnection with the input portion 110 and the drive pulley 30 (refer to FIG. 7) and to rotate at the second speed 204 when the output portion 170 is frictionally disengaged from the input portion 110 (refer to FIG. 8). Thus, the clutch system 10 can be configured as a fan clutch that facilitates the flow of cooling air at two different speeds.

Figure 9:
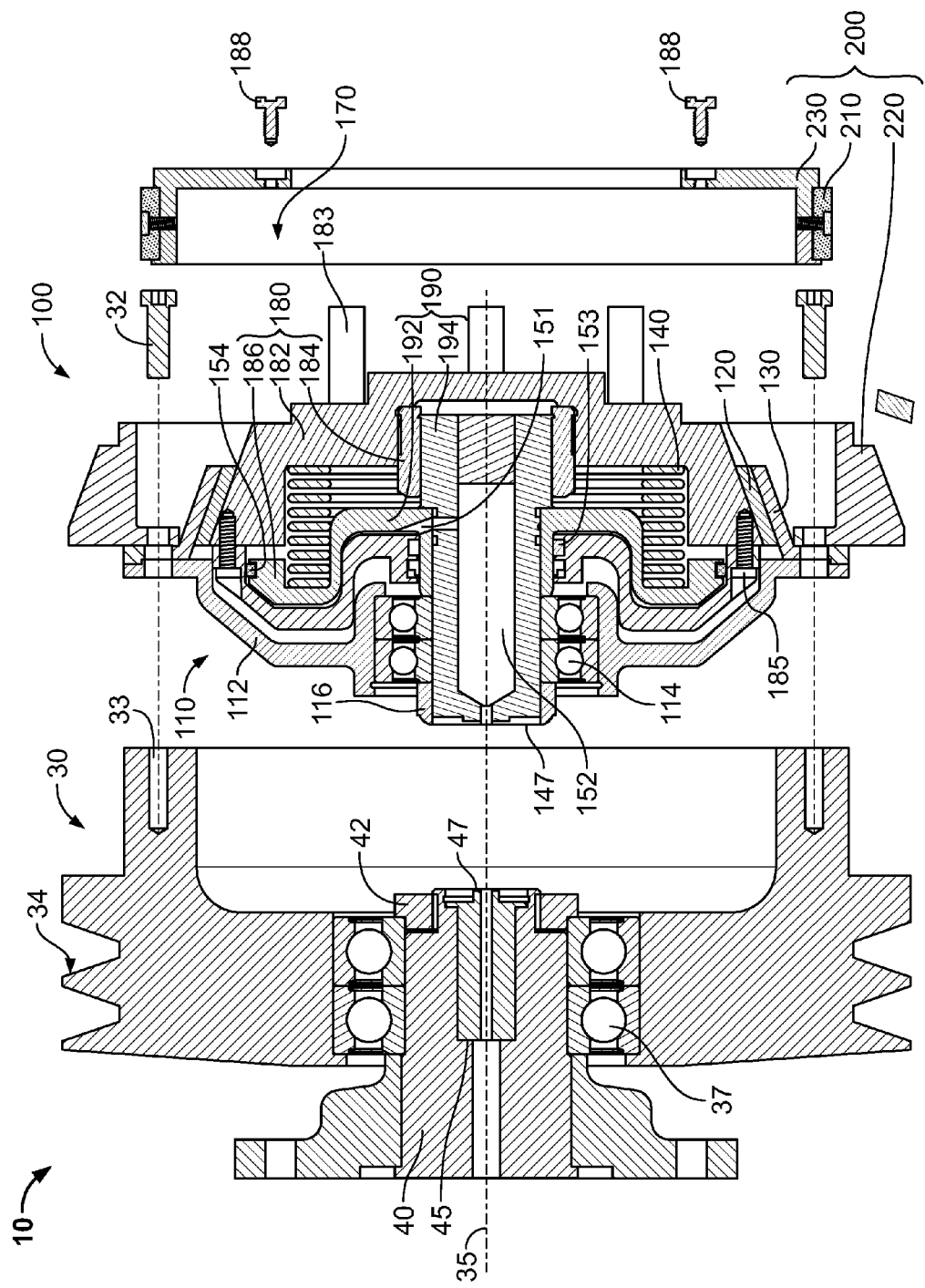
FIG. 9 is a cross-sectional exploded view of a clutch system in accordance with some embodiments.

Referring now to FIG. 9, a portion of the eddy current drive (e.g., the magnet ring 230, magnets 210, and the like) can be separated from the remainder of the clutch system 10 by removing the bolts 188. Such a configuration permits a user to readily service or replace the components of the eddy current drive system 200 without disassembly of the input portion 110 and output portion 170 of the clutch system 10. In some embodiments, the clutch system 10 can be configured such that the piston 180, hub 190, spring 140, and other components remain in an assembled state even after the clutch device 100 is removed from the drive pulley 30. In such circumstances, the spring 140 is not necessarily free to unexpectedly expand and separate the components when a user attempts to remove the clutch device 100 from the drive pulley 30. Thus, the clutch device 100 in this embodiment has a self-contained construction that permits the clutch device 100 to be readily removed from the drive pulley 30 without requiring clamps or other tooling to retain the clutch device 100 in its assembled state. The locking nut 116 and other such devices may be subsequently removed to disassemble the components of clutch device 100 (e.g., the piston 180, hub 190, spring 140, clutch ring 120, and the like) at a subsequent time.

In the embodiment depicted in FIG. 9, the clutch device 100 is mounted to the drive pulley 30 by the mounting bolts 32. As described previously, the magnet ring 230 can be readily removed from clutch device 100, by removing the screws 188 so as to provide access to the mounting bolts 32. The clutch device 100 can be promptly removed from the drive pulley 30 by withdrawing the bolts 32 from the mounting cavities 33 of the drive pulley 30. Removal of the bolts 32 allow for separation of the conductive ring 220, the opposing friction ring 130, the remainder of the clutch device 100, and the pulley 30. Upon removal of the bolts 32 from the drive pulley 30, the and subsequent removal of the clutch device 100 from the drive pulley 30, the internal spring 140 is not permitted to freely expand and thereby cause disassembly of the clutch device 100 (e.g., the spring 140 is not permitted to unexpectedly expand and separate the piston 180 and hub 190 when a user attempts to remove the clutch device 100 from the drive pulley 30). Instead, the components of the clutch device 100, such as the input plate 112, the piston 180, the hub 190, the clutch ring 120, and the spring 140, remain in the assembled state during the process of removal from the drive pulley 30.

To disassemble components of the clutch device 100, such as the input plate 112, the piston 180, the clutch ring 120, and the spring 140, the nut 116 can be removed from the second spline member 194. Once the nut 116 is removed, the bearings 114 and the input plate 112 can be removed. Removing the input plate 112 provides access to the assembly bolts 185. As previously described, the piston 180 includes the mounting plate 182 and the spring-engaging member 186 that are assembled together using the assembly bolts 185. To disassemble the piston 180 (e.g., separate the pressure actuated member 186 from the mounting plate 182), the bolts 185 can be removed. In this way, the clutch device 100 can be disassembled at another time (e.g., after the clutch device 100 is transported to a work bench or other area).

It should be understood from the description herein that the conductive ring 220 can be separated from the clutch device 100 after the mounting bolts 32 are withdrawn. Accordingly, the magnet ring 230, the conductive ring 220, and the opposing friction ring 130 can be removed from the clutch system 10 while the other components of the clutch device 100 (e.g., the input plate 112, the piston 180, the hub 190, the clutch ring 120, and the spring 140) remain in the assembled state. Such a configuration permits a user to readily service or replace the components of the eddy current drive system 200 without disassembly of the input portion 110 and output portion 170 of the clutch device 100. Accordingly, the clutch device 100 can have a self-contained construction that permits the clutch device 100 to be readily removed from the drive pulley 30 without requiring clamps or other tooling to retain the clutch device 100 in its assembled state. In such circumstances, the spring 140 is not free to unexpectedly expand and separate the components when a user attempts to remove the clutch device 100 from the drive pulley 30. Such a configuration can provide additional safety for the technician or other user and can reduce the complexity of repairing or replacing the clutch device 100 when servicing a vehicle.

Optionally, in some embodiments, the conductive ring 220 can be removed from the clutch system 10 in a manner similar to the removal of the magnet ring 230. For example, a subgroup of the mounting bolts 32 that secure the conductive ring 220, the opposing friction ring 130, and the remainder of the clutch device 100 to the pulley 30 can be configured to pass through corresponding bores in the conductive ring 220 without engaging the ring 220, while the remaining mounting bolts 32 can engage the ring 220. Thus, the ring 220 can be readily removed from the clutch device 100 by removing the ring-engaging subset of the bolts 32 while the remainder of the bolts 32 remain assembled to the pulley 30, thus retaining the clutch device 100 and the ring 130 to the pulley 30. It should be understood from the description herein that the non ring-engaging bolts 32 can remain in place so as to maintain the assembled relationship of the pulley 30, opposing ring 130, and the clutch device 100. In a similar manner, a subset of the non ring-engaging bolts 32 can be configured to pass through corresponding bores in the opposing ring 130 without engaging the ring 130, while the remaining mounting bolts 32 can engage the ring 130. Thus, the ring 130 can be readily removed from the clutch device 100 while the remainder of the clutch device 100 is secured to the pulley 30. In this way, the opposing ring 130 can be serviced or replaced without removing or disassembling the remainder of the clutch device 100.

It should be understood from the description herein that the drive source may have a configuration other than the drive pulley 30 shown in FIGS. 2-3. For example, the drive source 100 may be a shaft or gear that is urged to rotate by the engine (via a direct or indirect coupling). In such embodiments, the input plate 112 or other component of the input portion 110 can have a mounting configuration to removably attach to that particular drive source or may have an adapter member connected therebetween.

In yet another embodiment, the clutch ring 120 may be mounted to the input plate 112 or to another component of the input portion 110. In these embodiments, the opposing friction surface may be arranged on a portion of the piston 180 or otherwise coupled to the output portion 170. As such, the piston 180 can be actuated to cause the friction surface of clutch ring 120 to be selectively engaged or disengaged with the opposing friction surface.

A number of embodiments of the invention have been described. Nevertheless, it will be understood that various modifications may be made without departing from the spirit and scope of the invention. Accordingly, other embodiments are within the scope of the following claims.

What is claimed is:

1. A fan clutch system, comprising:
   a drive pulley;
   a clutch device removably mounted to the drive pulley, including:
   an input portion that is coupled with the drive pulley so that the input portion rotates with the drive pulley at a first speed,
   an output portion adjustable between a disengaged position and an engaged position so as to frictionally engage the input portion and rotate at the first speed, and
   a frusto-conical friction interface at least partially defined by engagement between a first friction surface of the input portion and a second friction surface of the output portion that is arranged radially inward of the first friction surface, the frusto-conical friction interface decreasing in radius as the frusto-conical friction interface extends axially away from the drive pulley; and
   a fan blade device rotationally coupled to the output portion of the clutch device so as to generate a fan thrust load when the output portion frictionally engages the input portion to rotate at the first speed, the fan thrust load urging the output portion in an axial direction away from the drive pulley.

2. The system of claim 1, wherein the fan thrust load urges the second friction surface of the output portion toward engagement with the first friction surface of the input portion.

3. The system of claim 2, wherein the fan thrust load urges the second friction surface of the output portion toward engagement with the first friction surface of the input portion so as to supplement a primary engagement force applied by one or more springs that urge the second friction surface toward the first friction surface.

4. The system of claim 1, wherein frusto-conical friction interface is at least partially defined by a frusto-conical clutch ring attached to one of the input portion and the output portion, the frusto-conical clutch ring including generally parallel outer and inner surfaces that each have an increasingly smaller radius as the clutch ring extends axially away from the drive pulley.

5. The system of claim 4, wherein the inner surface of frusto-conical clutch ring is arranged radially outward of a clutch ring mounting surface of the output portion.

6. The system of claim 5, wherein the outer surface of frusto-conical clutch ring defines the second friction surface of the output portion when the frusto-conical clutch ring is mounted to the output portion, and the clutch ring selectively engages the first friction surface of the input portion as the output portion is selectively adjusted to the engaged position.

7. The fan clutch device of claim 1, wherein the output portion includes: a hub that is selectively movable relative to the input portion, and a piston adjustable in an axial direction relative to the input portion, the piston being adjustable between first and second positions so as to adjust the output portion between the disengaged position and the engaged position relative to the input portion.

8. The system of claim 7, wherein the piston portion comprises one or more mounting members to receive the fan blade device.

9. The system of claim 7, further comprising a fluid-receiving space at least partially defined by a surface of the piston portion of the output portion, and a spring device to urge the piston portion toward the first position relative to the input portion.

10. The system of claim 1, wherein the clutch device further comprises an eddy current drive system that urges the output portion to rotate at a second speed different from the first speed when the output portion is in the disengage position relative to the input portion, the eddy current drive system including: permanent magnets coupled to one of the output portion and the input portion, and a ring of generally nonmagnetic material coupled to the other the output portion and the input portion so that a radial gap is defined between the permanent magnets and the ring of generally nonmagnetic material.

11. The system of claim 10, wherein in response to the output portion being adjusted from the engaged position to the disengaged position, the permanent magnets are displaced relative to the ring of generally nonmagnetic material while the radial gap therebetween remains substantially constant.

12. The system of claim 11, wherein the ring of generally nonmagnetic material includes radially extending cooling fins to dissipate heat.

13. A fan clutch device to be mounted to a drive pulley, the fan clutch device comprising:
  an input member that is removably mountable to a drive pulley so that the input member rotates with the drive pulley;
  an output member including: one or more mounting members to receive a fan blade device, a hub that is selectively movable relative to the input member, and a piston adjustable in an axial direction relative to the input member, the piston being adjustable between first and second positions, wherein the output member rotates at a first speed with the input member when the piston is in the first position; and
  a frusto-conical clutch ring to provide frictional coupling between the input member and the output member, the frusto-conical clutch ring including generally parallel outer and inner surfaces that each have an increasingly smaller radius as the clutch ring extends axially away from the drive pulley when the fan clutch device is mounted to the drive pulley, wherein the output member contacts the inner surface of the frusto-conical clutch ring and the input member contacts the outer surface of the frusto-conical clutch ring,
  wherein the frictional coupling between the input member and the output member is supplemented by a fan thrust force from the fan blade device when the fan blade device is mounted to the output member, the fan thrust force urging the output member in an axial direction away from the drive pulley when the output member rotates at the first speed.

14. The fan clutch device of claim 13, wherein the fan thrust force urges compression of the frusto-conical clutch ring between output member and the input member.

15. The fan clutch device of claim 14, wherein the frusto-conical clutch ring is arranged radially outward of the output member and is arranged radially inward of the input member.

16. The fan clutch device of claim 15, further comprising a fluid-receiving space at least partially defined by a surface of the piston of the output member, and a spring device to urge the piston toward the first position relative to the input member.

17. The fan clutch device of claim 13, further comprises an eddy current drive system that urges the output member to rotate at a second speed different from the first speed when the output portion is in the second position relative to the input member, the eddy current drive system including: permanent magnets coupled to one of the output member and the input member, and a ring of generally nonmagnetic material coupled to the other the output member and the input member so that a radial gap is defined between the permanent magnets and the ring of generally nonmagnetic material.

18. The fan clutch device of claim 17, wherein the ring of generally nonmagnetic material includes radially extending cooling fins to dissipate heat.

19. A method of operating a fan clutch system, comprising:
  rotating an input portion of a fan clutch device to rotate at a first speed with a drive pulley, the fan clutch device being removably mounted to the drive pulley;
  adjusting an output portion of the clutch device to frictionally engage the input portion of the clutch device along a frusto-conical friction interface so that the output portion and a fan blade device mounted thereto rotate at the first speed, wherein the output portion that is arranged radially inward of the frusto-conical friction interface, the frusto-conical friction interface decreasing in radius as the frusto-conical friction interface extends axially away from the drive pulley; and
  generating a fan thrust load when the output portion frictionally engages the input portion to rotate at the first speed, the fan thrust load urging the output portion in an axial direction away from the drive pulley.

20. The method of claim 19, wherein the fan thrust load urges the output portion to compress a frusto-conical clutch ring against the input portion.

* * * * *